US009965685B2

(12) United States Patent
Matsuoka et al.

(10) Patent No.: US 9,965,685 B2
(45) Date of Patent: May 8, 2018

(54) METHOD AND SYSTEM FOR DETECTING AN AUDIO EVENT FOR SMART HOME DEVICES

(71) Applicant: Google Inc., Mountain View, CA (US)

(72) Inventors: Yoky Matsuoka, Los Altos Hills, CA (US); Rajeev Conrad Nongpiur, Palo Alto, CA (US); Michael Dixon, Sunnyvale, CA (US)

(73) Assignee: Google LLC, Mountian View, CA (US)

( * ) Notice: Subject to any disclaimer, the term of this patent is extended or adjusted under 35 U.S.C. 154(b) by 116 days.

(21) Appl. No.: 14/737,678

(22) Filed: Jun. 12, 2015

(65) Prior Publication Data

US 2016/0364963 A1 Dec. 15, 2016

(51) Int. Cl.
*G10L 25/51* (2013.01)
*G10L 25/03* (2013.01)
(Continued)

(52) U.S. Cl.
CPC ..... *G06K 9/00771* (2013.01); *G08B 21/0208* (2013.01); *G10L 25/51* (2013.01);
(Continued)

(58) Field of Classification Search
CPC ......... G10L 25/03; G10L 25/27; G10L 25/48; G10L 25/72; G10L 25/78; G10L 25/84; G06B 21/0202
(Continued)

(56) References Cited

U.S. PATENT DOCUMENTS 5,189,701 A * 2/1993 Jain .................... G10L 25/90
704/207
5,452,274 A * 9/1995 Thompson ............ G09F 25/00
367/197
(Continued)

FOREIGN PATENT DOCUMENTS

WO 2011025460 A1 3/2011

OTHER PUBLICATIONS

Lu, Li, et al. "A svm-based audio event detection system." Electrical and Control Engineering (ICECE), 2010 International Conference on. IEEE, Jun. 2010, pp. 292-295.*
(Continued)

*Primary Examiner* — James Wozniak
(74) *Attorney, Agent, or Firm* — Morris & Kamlay LLP

(57) ABSTRACT

This application discloses a method implemented by an electronic device to detect a signature event (e.g., a baby cry event) associated with an audio feature (e.g., baby sound). The electronic device obtains a classifier model from a remote server. The classifier model is determined according to predetermined capabilities of the electronic device and ambient sound characteristics of the electronic device, and distinguishes the audio feature from a plurality of alternative features and ambient noises. When the electronic device obtains audio data, it splits the audio data to a plurality of sound components each associated with a respective frequency or frequency band and including a series of time windows. The electronic device further extracts a feature vector from the sound components, classifies the extracted feature vector to obtain a probability value according to the classifier model, and detects the signature event based on the probability value.

23 Claims, 20 Drawing Sheets

(51) Int. Cl.
| | |
|---|---|
| *G10L 25/72* | (2013.01) |
| *G10L 25/78* | (2013.01) |
| *G06K 9/00* | (2006.01) |
| *H04R 3/00* | (2006.01) |
| *G08B 21/02* | (2006.01) |
| *G10L 25/27* | (2013.01) |
| *G08B 1/08* | (2006.01) |

(52) U.S. Cl.
CPC ............... *H04R 3/00* (2013.01); *G08B 1/08* (2013.01); *G10L 25/27* (2013.01); *G10L 25/72* (2013.01); *G10L 25/78* (2013.01); *H04R 2410/05* (2013.01)

(58) Field of Classification Search
USPC .................. 704/231, 233, 236, 239, 274
See application file for complete search history.

(56) References Cited

U.S. PATENT DOCUMENTS

| | | | | |
|---|---|---|---|---|
| 5,668,780 | A * | 9/1997 | Hsieh | G10L 17/26 367/198 |
| 6,363,348 | B1 * | 3/2002 | Besling | G06K 9/6217 704/251 |
| 7,234,340 | B2 | 6/2007 | Wen et al. | |
| 8,655,655 | B2 * | 2/2014 | Wang | G10L 15/10 704/216 |
| 9,058,820 | B1 * | 6/2015 | Mascaro | G10L 25/93 |
| 9,093,120 | B2 * | 7/2015 | Bilobrov | G11B 27/28 |
| 2002/0135485 | A1 * | 9/2002 | Arakawa | G08B 21/0208 340/573.1 |
| 2003/0050783 | A1 * | 3/2003 | Yoshizawa | G10L 15/065 704/270.1 |
| 2003/0055634 | A1 * | 3/2003 | Hidaka | G10L 25/00 704/222 |
| 2003/0182131 | A1 * | 9/2003 | Arnold | G10L 15/32 704/275 |
| 2005/0187761 | A1 * | 8/2005 | Shi | G10L 25/93 704/213 |
| 2005/0199064 | A1 * | 9/2005 | Wen | G01H 1/00 73/584 |
| 2006/0020958 | A1 * | 1/2006 | Allamanche | G10L 25/48 725/19 |
| 2006/0053003 | A1 * | 3/2006 | Suzuki | G10L 25/78 704/216 |
| 2006/0256660 | A1 * | 11/2006 | Berger | G01S 5/20 367/124 |
| 2008/0001735 | A1 * | 1/2008 | Tran | G06F 19/3418 340/539.22 |
| 2008/0240458 | A1 * | 10/2008 | Goldstein | H04R 25/453 381/72 |
| 2008/0243512 | A1 * | 10/2008 | Breebaart | G10H 1/0008 704/270 |
| 2008/0269625 | A1 * | 10/2008 | Halperin | A61B 5/113 600/508 |
| 2008/0300871 | A1 * | 12/2008 | Gilbert | G10L 15/20 704/233 |
| 2008/0305815 | A1 * | 12/2008 | McDonough | H04L 12/5895 455/466 |
| 2009/0171663 | A1 * | 7/2009 | Badt | G10L 15/187 704/257 |
| 2009/0254352 | A1 * | 10/2009 | Zhao | G10L 25/78 704/500 |
| 2010/0004926 | A1 * | 1/2010 | Neoran | G10L 25/48 704/201 |
| 2010/0027820 | A1 * | 2/2010 | Kates | G10L 25/00 381/312 |
| 2010/0082336 | A1 * | 4/2010 | Kida | G10L 25/90 704/206 |
| 2010/0145210 | A1 * | 6/2010 | Graff | A61B 5/02007 600/528 |
| 2010/0145639 | A1 * | 6/2010 | Fu | G01H 1/003 702/56 |
| 2011/0046958 | A1 * | 2/2011 | Liu | G10L 17/02 704/268 |
| 2011/0075851 | A1 * | 3/2011 | LeBoeuf | H04R 29/00 381/56 |
| 2011/0075993 | A1 * | 3/2011 | Pastrnak | G11B 27/02 386/285 |
| 2011/0208521 | A1 * | 8/2011 | McClain | G10L 15/142 704/233 |
| 2012/0002820 | A1 * | 1/2012 | Leichter | G10L 21/0208 381/73.1 |
| 2012/0143363 | A1 | 6/2012 | Liu et al. | |
| 2014/0055610 | A1 * | 2/2014 | Ko | G06K 9/00771 348/143 |
| 2014/0056432 | A1 | 2/2014 | Loui et al. | |
| 2014/0180675 | A1 * | 6/2014 | Neuhauser | G06F 17/28 704/9 |
| 2015/0081283 | A1 * | 3/2015 | Sun | G10L 25/90 704/205 |
| 2015/0120287 | A1 * | 4/2015 | Stern | G10L 15/183 704/231 |
| 2015/0262574 | A1 * | 9/2015 | Terao | G10L 25/63 704/246 |
| 2015/0265206 | A1 * | 9/2015 | Sheinkopf | G10L 25/66 600/586 |
| 2015/0371628 | A1 * | 12/2015 | Kreifeldt | G10L 15/02 704/254 |
| 2016/0150338 | A1 * | 5/2016 | Kim | G08B 1/08 381/58 |
| 2016/0155456 | A1 * | 6/2016 | Wang | G10L 25/81 704/208 |

OTHER PUBLICATIONS

Jarina, Roman, et al. "Development of a reference platform for generic audio classification." 2008 Ninth International Workshop on Image Analysis for Multimedia Interactive Services. IEEE, May 2008, pp. 239-242.*

Portelo, Jose, et al. "Non-speech audio event detection." 2009 IEEE International Conference on Acoustics, Speech and Signal Processing. IEEE, Apr. 2009, pp. 1973-1976.*

Temko, Andrey, et al. "Acoustic event detection and classification in smart-room environments: Evaluation of CHIL project systems." Cough 65.48, 2006, pp. 1-6.*

Temko, Andrey, et al. "Classification of acoustic events using SVM-based clustering schemes." Pattern Recognition 39.4, Apr. 2006, pp. 682-694.*

Tran, Huy Dat, et al. "Sound event recognition with probabilistic distance SVMs." IEEE transactions on audio, speech, and language processing 19.6, Aug. 2011, pp. 1556-1568.*

Valenzise, Giuseppe, et al. "Scream and gunshot detection and localization for audio-surveillance systems." Advanced Video and Signal Based Surveillance, 2007. AVSS 2007. IEEE Conference on. IEEE, Sep. 2007, pp. 21-26.*

Zhuang, Xiaodan, et al. "Real-world acoustic event detection." Pattern Recognition Letters 31.12, Sep. 2010, pp. 1543-1551.*

* cited by examiner

*Comprehensive Feature Vector* $= FV1 \,\|\, FV2 \,\|\, \ldots =$ $[MaxMag\_f1\_max,$
$MaxMag\_f1\_min,$
$MaxMag\_f1\_med,$
$MaxMag\_f1\_mm,$
$F\_Max\_f1\_max,$
$F\_Max\_f1\_min,$
$F\_Max\_f1\_med,$
$F\_Max\_f1\_mm,$
$\Delta F\_Max\_f1\_max,$
$\Delta F\_Max\_f1\_min,$
$\Delta F\_Max\_f1\_med,$
$\Delta F\_Max\_f1\_mm,$
$E\_log\_f2\_max,$
$E\_log\_f2\_min,$
$E\_log\_f2\_med,$
$E\_log\_f2\_mm,$
$\Delta E\_f2\_max,$
$\Delta E\_f2\_min,$
$\Delta E\_f2\_med,$
$\Delta E\_f2\_mm,$
$MaxMag\_f3\_max,$
$MaxMag\_f3\_min,$
$MaxMag\_f3\_med,$
$MaxMag\_f3\_mm,$
$F\_Max\_f3\_max,$
$F\_Max\_f3\_min,$
$F\_Max\_f3\_med,$
$F\_Max\_f3\_mm,$
$\Delta F\_Max\_f3\_max,$
$\Delta F\_Max\_f3\_min,$
$\Delta F\_Max\_f3\_med,$
$\Delta F\_Max\_f3\_mm,$
$E\_log\_f3\_max,$
$E\_log\_f3\_min,$
$E\_log\_f3\_med,$
$E\_log\_f3\_mm,$
$\Delta E\_f3\_max,$
$\Delta E\_f3\_min,$
$\Delta E\_f3\_med,$
$\Delta E\_f3\_mm]_1$ $\|$ $[MaxMag\_f1\_max,$
$MaxMag\_f1\_min,$
$MaxMag\_f1\_med,$
$MaxMag\_f1\_mm,$
$F\_Max\_f1\_max,$
$F\_Max\_f1\_min,$
$F\_Max\_f1\_med,$
$F\_Max\_f1\_mm,$
$\Delta F\_Max\_f1\_max,$
$\Delta F\_Max\_f1\_min,$
$\Delta F\_Max\_f1\_med,$
$\Delta F\_Max\_f1\_mm,$
$E\_log\_f2\_max,$
$E\_log\_f2\_min,$
$E\_log\_f2\_med,$
$E\_log\_f2\_mm,$
$\Delta E\_f2\_max,$
$\Delta E\_f2\_min,$
$\Delta E\_f2\_med,$
$\Delta E\_f2\_mm,$
$MaxMag\_f3\_max,$
$MaxMag\_f3\_min,$
$MaxMag\_f3\_med,$
$MaxMag\_f3\_mm,$
$F\_Max\_f3\_max,$
$F\_Max\_f3\_min,$
$F\_Max\_f3\_med,$
$F\_Max\_f3\_mm,$
$\Delta F\_Max\_f3\_max,$
$\Delta F\_Max\_f3\_min,$
$\Delta F\_Max\_f3\_med,$
$\Delta F\_Max\_f3\_mm,$
$E\_log\_f3\_max,$
$E\_log\_f3\_min,$
$E\_log\_f3\_med,$
$E\_log\_f3\_mm,$
$\Delta E\_f3\_max,$
$\Delta E\_f3\_min,$
$\Delta E\_f3\_med,$
$\Delta E\_f3\_mm]_2$ $\| \ldots \ldots$

Figure 10

Does client device (cell phone) needs to implement the feature extraction stuffs?

On an electronic device having one or more processors and memory storing one or more programs for execution by the one or more processors, automatically and without user intervention: ─── 1700

Obtaining from a remote server a classifier model that distinguishes an audio feature from a plurality of alternative features and ambient noises, wherein the classifier model is determined by the remote server according to predefined capabilities of the electronic device and ambient sound characteristics of the electronic device 1702

Obtaining audio data associated with an audio signal 1704

Splitting the audio data to a plurality of sound components each associated with a respective frequency or frequency band and including a series of time windows 1706

Splitting the audio data to the plurality of sound components includes: 1708
  for each executive time window:
    applying a Fast Fourier Transform (FFT) to obtain a plurality of FFT coefficients associated with the energy levels and the harmonic characteristics for the plurality of sound components each associated with the respective frequency or frequency band At least two of the time windows are consecutive time windows that partially overlap in time 1710

Each of the series of time windows lasts 30 msec 1712

The plurality of sound components includes at least three sound components that are associated respectively with a low frequency band, an intermediate frequency band and a high frequency band 1714

Each of the plurality of sound components is associated with one or more of the following frequency bands: 900 Hz and below, 1000-5000 Hz, and 6000 Hz and higher 1716

The plurality of sound components includes at least one sound component that is associated with a frequency or frequency band related to a baby cry 1718

In accordance with the statistical analysis of the plurality of sound components, extracting a feature vector from the plurality of sound components ... 1726

> The feature vector including a first subset of elements associated with energy levels of a first subset of sound components, and a second subset of elements associated with harmonic characteristics of a second subset of sound components, wherein the first and second subsets of elements in the feature vector are arranged according the predetermined order 1728

(B)

>> The first subset of elements includes one or more of a maximum energy level, a minimum energy level, a median energy level, a mean energy level and a difference between the maximum and minimum energy levels that each of the first subset of sound components has across the series of time windows 1734

>> The first subset of elements includes one or more of a maximum energy variation, a minimum energy variation, a median energy variation, a mean energy variation and a difference between the maximum and minimum energy variations that each of the first subset of sound components has across the series of time windows 1736

>> The harmonic characteristics of the second subset of sound components are associated with a respective harmonic peak for each sound component at each of the series of time windows, and include one or more of an intensity value, a harmonic frequency and a variation of the harmonic frequency of the respective harmonic peak 1738

>>> The first subset of elements includes one or more of a maximum energy variation, a minimum energy variation, a median energy variation, a mean energy variation and a difference between the maximum and minimum energy variations that each of the first subset of sound components has across the series of time windows 1740

METHOD AND SYSTEM FOR DETECTING AN AUDIO EVENT FOR SMART HOME DEVICES

TECHNICAL FIELD

This relates generally to computer technology, including but not limited to methods and systems for detection of an audio event (e.g., a baby cry) from an audio signal captured by a smart home device.

BACKGROUND

Smart home devices normally have the capability of collecting real-time multimedia data (including video and/or audio data) and identifying events in the collected multimedia data. For example, some multimedia surveillance devices identify individual audio events including screams and gunshots. Another automatic health monitoring device detects cough sound as a representative acoustical symptom of abnormal health conditions for the purposes of attending to the health of the aged who live alone. Some home devices include digital audio applications to classify the acoustic events to distinct classes (e.g., music, news, sports, cartoon and movie). Regardless of the audio events or classes that are detected, existing home devices rely on predetermined audio programs to identify individual audio events independently or, at most, the audio events in the context of general background noise. These smart home devices do not differentiate multiple audio events that often occur simultaneously, nor do they adjust the predetermined audio programs according to the capabilities of the home devices and the variation of the ambient environments. It would be beneficial to have a more efficient audio event detection mechanism than the current practice.

SUMMARY

Accordingly, there is a need for improving an audio event detection method used in an electronic device by associating the electronic device with a classifier model that distinguishes a specific audio feature (e.g., a baby sound) from a plurality of alternative predetermined audio features as well as from ambient noises of the electronic device. In various implementations of this application, the classifier model is provided and updated by a remote server system according to some classifier determinant factors including, but not limited to, the capability of the electronic device and ambient sound characteristics. Such methods optionally complement or replace conventional methods of using a predetermined and fixed audio event detection program to identify the audio feature independently of these classifier determinant factors.

In accordance with one aspect of this application, a method for detecting a signature event associated with an audio feature is implemented on an electronic device having one or more processors and memory storing one or more programs for execution by the one or more processors. The method includes automatically and without user intervention, obtaining from a remote server a classifier model that distinguishes an audio feature from a plurality of alternative features and ambient noises. The classifier model is determined by the remote server according to predefined capabilities of the electronic device and ambient sound characteristics of the electronic device. The method further includes obtaining audio data associated with an audio signal, and splitting the audio data to a plurality of sound components. Each sound component is associated with a respective frequency or frequency band, and includes a series of time windows. The method further includes statistically analyzing each of the plurality of sound components across the series of time windows, and in accordance with the statistical analysis of the plurality of sound components, extracting a feature vector from the plurality of sound components. The feature vector includes a plurality of elements that are arranged according a predetermined order. The method further includes in accordance with the classifier model provided by the remote server, classifying the extracted feature vector to obtain a probability value indicating whether the audio signal includes the audio feature within the series of time windows. The method further includes detecting the signature event associated with the audio feature based on the probability value associated with the audio signal and issuing an alert indicating occurrence of the signature event.

In accordance with one aspect of this application, an electronic device is configured to detect a signature event associated with an audio feature. The electronic device includes one or more processors, and memory storing one or more programs to be executed by the one or more processors. The one or more programs further include instructions for implementing the operations of the above method for detecting the signature event associated with the audio feature.

In accordance with some implementations, an electronic device includes means for performing the operations of any of the methods described above.

In accordance with another aspect of this application, a method for detecting a signature event associated with an audio feature is implemented on an electronic device having one or more processors and memory storing one or more programs for execution by the one or more processors. The method includes obtaining audio data associated with an audio signal, and splitting the audio data to a plurality of sound components each associated with a respective frequency or frequency band and including a series of time windows. The method further includes statistically analyzing each of the plurality of sound components across the series of time windows. The method further includes in accordance with the analysis of the plurality of sound components, extracting a feature vector from the plurality of sound components, and the feature vector includes a first subset of elements associated with energy levels of a first subset of sound components, and a second subset of elements associated with harmonic characteristics of a second subset of sound components. The first and second subsets of elements in the feature vector are arranged according a predetermined order. The method further includes in accordance with a classifier model provided by a remote server, classifying the extracted feature vector to obtain a probability value indicating whether the audio signal includes the audio feature within the series of time windows, and the classifier is configured to recognize the audio feature according to feature vectors that include elements arranged according to the predetermined order. The method further includes detecting the signature event associated with the audio feature based on the probability value associated with the audio signal and issuing an alert indicating occurrence of the signature event.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 10 is a feature vector that has been extracted by a feature extractor shown in FIG. 9 in accordance with some implementations.

FIGS. 17A-17D are flow diagrams illustrating a method of detecting a signature event associated with an audio feature in accordance with some implementations.

Like reference numerals refer to corresponding parts throughout the several views of the drawings.

DESCRIPTION OF IMPLEMENTATIONS

Figure 1:
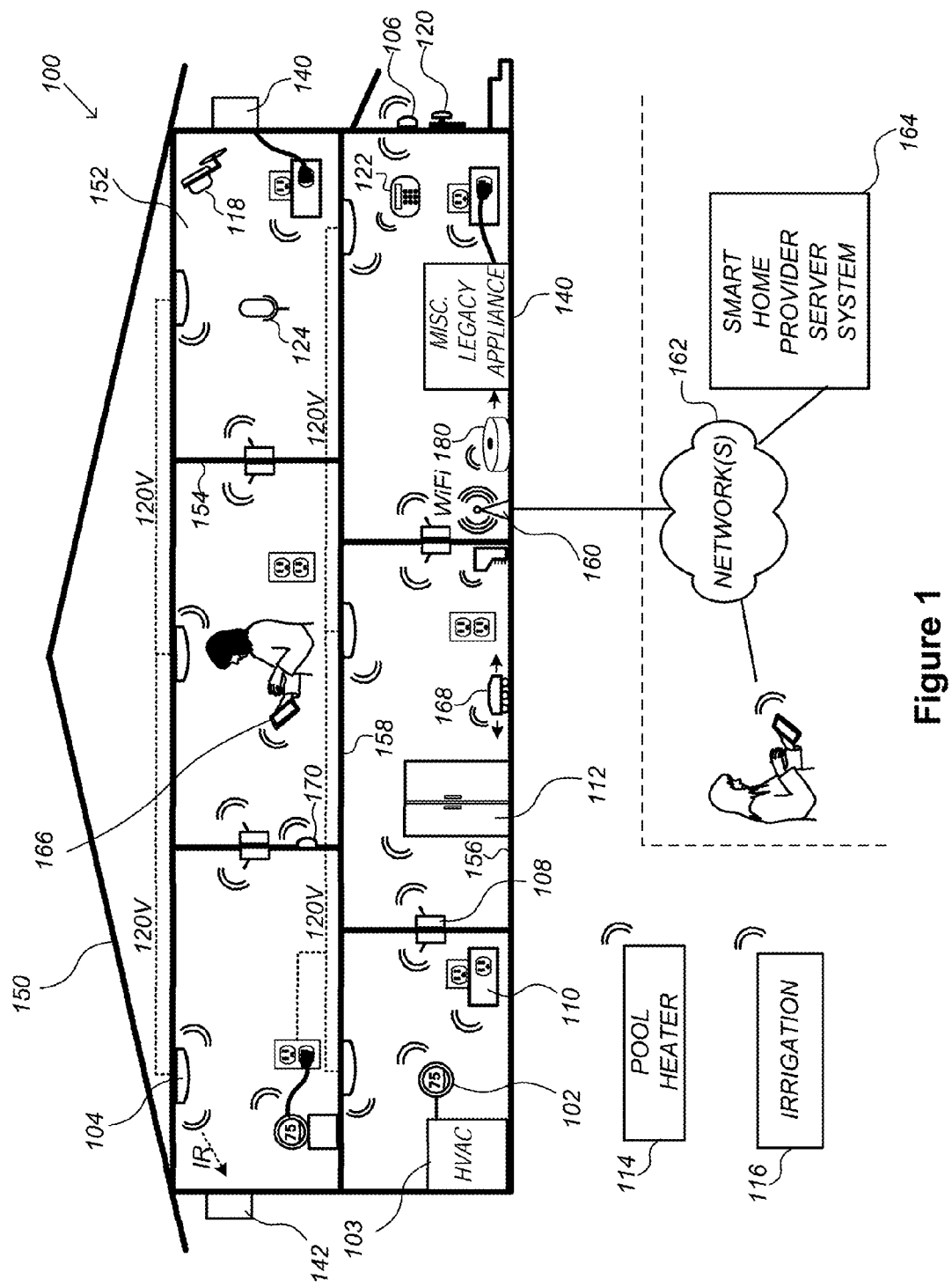
FIG. 1 is an example smart home environment, in accordance with some implementations.

In various implementations of the application, an electronic device that includes a microphone is configured to capture an audio signal, and further process the audio signal locally for the purposes of extracting a predetermined audio feature and detecting a corresponding signature audio event. Specifically, a server system obtains a set of classifier determinant factors including capabilities and ambient sound characteristics of the electronic device, and adaptively generates a classifier model based on the classifier determinant factors. In some implementations, the choice of the classifier model is also determined by several other factors, such as amount of data that is available in the server system for training the classifier model. The classifier model, once adaptively determined, is used by the electronic device to extract a feature vector, classify the feature vector to identify a probability value associated with the audio feature, and detect the corresponding signature event. In some implementations, one or more operations of feature extraction, feature classification and event extraction are implemented remotely in the server system.

In a specific example, the audio feature is associated with baby sound, and the signature event is associated with an extended baby cry event. This application is applied to identify baby sound, and detect extended baby cry events when the baby sound is consistently identified according to predetermined event detection criteria. Given that the classifier model is determined according to the capabilities of the electronic device, the electronic device takes advantage of its processing, storage and communication capabilities to detect the baby cry events promptly when a baby wakes up and starts crying. Further, the classifier model is adaptively determined according to the ambient sound characteristics of the electronic device. The ambient sound characteristics are associated with alternative audio features and ambient noises both of which coexist with the feature sound (i.e., the baby sound here). Thus, detection of the baby cry event is robust to other non-baby cry feature sounds (e.g., adult conversation, adult baby talk, lullabies, music, sirens, and train horns) and typical home noise (e.g., noise from refrigerators, heating/ventilation/air conditioning systems, washing machines, dining, and television) that may happen when the baby is asleep. In some implementations, detection of the baby cry event can also be configured to be robust to sounds that babies may make when sleeping.

In some implementations, data used for training the classifier model reflect the characteristics of the ambient environment of the electronic device, e.g., room sizes, reverberation, distances between a baby and the microphone of the electronic device, and microphone specific response. When the classifier model is adaptively determined according such training data, detection of the baby cry event is robust to sound disturbance caused by these characteristics of the ambient environment as well.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first type of audio feature can be termed a second type of audio feature, and, similarly, a second type of audio feature can be termed a first type of audio feature, without departing from the scope of the various described implementations. The first type of audio feature and the second type of audio feature are both types of audio features, but they are not the same type of audio feature.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

It is also to be appreciated that while the terms user, customer, installer, homeowner, occupant, guest, tenant, landlord, repair person, and the like may be used to refer to the person or persons acting in the context of some particularly situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. Importantly, while the identity of the person performing the action may be germane to a particular advantage provided by one or more of the implementations, such identity should not be construed in the descriptions that follow as necessarily limiting the scope of the present teachings to those particular individuals having those particular identities.

FIG. 1 is an example smart home environment 100 in accordance with some implementations. Smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. Further, the smart home environment 100 may control and/or be coupled to devices outside of the actual structure 150. Indeed, several devices in the smart home environment 100 need not be physically within the structure 150. For example, a device controlling a pool heater 114 or irrigation system 116 may be located outside of the structure 150.

The depicted structure 150 includes a plurality of rooms 152, separated at least partly from each other via walls 154. The walls 154 may include interior walls or exterior walls. Each room may further include a floor 156 and a ceiling 158. Devices may be mounted on, integrated with and/or supported by a wall 154, floor 156 or ceiling 158.

In some implementations, the integrated devices of the smart home environment 100 include intelligent, multi-sensing, network-connected devices that integrate seamlessly with each other in a smart home network (e.g., 202 FIG. 2) and/or with a central server or a cloud-computing system to provide a variety of useful smart home functions. The smart home environment 100 may include one or more intelligent, multi-sensing, network-connected thermostats 102 (hereinafter referred to as "smart thermostats 102"), one or more intelligent, network-connected, multi-sensing hazard detection units 104 (hereinafter referred to as "smart hazard detectors 104"), one or more intelligent, multi-sensing, network-connected entryway interface devices 106 and 120 (hereinafter referred to as "smart doorbells 106" and "smart door locks 120"), and one or more intelligent, multi-sensing, network-connected alarm systems 122 (hereinafter referred to as "smart alarm systems 122").

In some implementations, the one or more smart thermostats 102 detect ambient climate characteristics (e.g., temperature and/or humidity) and control a HVAC system 103 accordingly. For example, a respective smart thermostat 102 includes an ambient temperature sensor.

The one or more smart hazard detectors 104 may include thermal radiation sensors directed at respective heat sources (e.g., a stove, oven, other appliances, a fireplace, etc.). For example, a smart hazard detector 104 in a kitchen 153 includes a thermal radiation sensor directed at a stove/oven 112. A thermal radiation sensor may determine the temperature of the respective heat source (or a portion thereof) at which it is directed and may provide corresponding blackbody radiation data as output.

The smart doorbell 106 and/or the smart door lock 120 may detect a person's approach to or departure from a location (e.g., an outer door), control doorbell/door locking functionality (e.g., receive user inputs from a portable electronic device 166-1 to actuate bolt of the smart door lock 120), announce a person's approach or departure via audio or visual means, and/or control settings on a security system (e.g., to activate or deactivate the security system when occupants go and come).

The smart alarm system 122 may detect the presence of an individual within close proximity (e.g., using built-in IR sensors), sound an alarm (e.g., through a built-in speaker, or by sending commands to one or more external speakers), and send notifications to entities or users within/outside of the smart home network 100. In some implementations, the smart alarm system 122 also includes one or more input devices or sensors (e.g., keypad, biometric scanner, NFC transceiver, microphone) for verifying the identity of a user, and one or more output devices (e.g., display, speaker). In some implementations, the smart alarm system 122 may also be set to an "armed" mode, such that detection of a trigger condition or event causes the alarm to be sounded unless a disarming action is performed.

In some implementations, the smart home environment 100 includes one or more intelligent, multi-sensing, network-connected wall switches 108 (hereinafter referred to as "smart wall switches 108"), along with one or more intelligent, multi-sensing, network-connected wall plug interfaces 110 (hereinafter referred to as "smart wall plugs 110"). The smart wall switches 108 may detect ambient lighting conditions, detect room-occupancy states, and control a power and/or dim state of one or more lights. In some instances, smart wall switches 108 may also control a power state or speed of a fan, such as a ceiling fan. The smart wall plugs 110 may detect occupancy of a room or enclosure and control supply of power to one or more wall plugs (e.g., such that power is not supplied to the plug if nobody is at home).

In some implementations, the smart home environment 100 of FIG. 1 includes a plurality of intelligent, multi-sensing, network-connected appliances 112 (hereinafter referred to as "smart appliances 112"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 140, such as old conventional washer/dryers, refrigerators, and the like, which may be controlled by smart wall plugs 110. The smart home environment 100 may further include a variety of partially communicating legacy appliances 142, such as infrared ("IR") controlled wall air conditioners or other IR-controlled devices, which may be controlled by IR signals provided by the smart hazard detectors 104 or the smart wall switches 108.

In some implementations, the smart home environment 100 includes one or more network-connected cameras 118 that are configured to provide video monitoring and security in the smart home environment 100. The cameras 118 may be used to determine occupancy of the structure 150 and/or particular rooms 152 in the structure 150, and thus may act as occupancy sensors. For example, video captured by the cameras 118 may be processed to identify the presence of an occupant in the structure 150 (e.g., in a particular room 152). Specific individuals may be identified based, for example, on their appearance (e.g., height, face) and/or movement (e.g., their walk/gait). Cameras 118 may additionally include one or more sensors (e.g., IR sensors, motion detectors), input devices (e.g., microphone for capturing audio), and output devices (e.g., speaker for outputting audio).

Alternatively, in some implementations, the smart home environment 100 includes one or more network-connected microphone device 124 that are configured to capture audio and provide security functions in the smart home environment 100. Optionally, the microphone device 124 is a stand-alone device that is not included in any other smart device, and can be regarded as a type of smart home device in this application. Optionally, the microphone device 124 is part of another client device 502 or another smart electronic device other than the cameras 118. The microphone device 124 may be used to determine occupancy of the structure 150 and/or particular rooms 152 in the structure 150, and thus may act as occupancy sensors. Specifically, audio captured by the microphone device 124 may be processed to identify the presence of an occupant in the structure 150 (e.g., in a particular room 152). Specific individuals may be identified based, for example, on characteristic of their voices.

In some implementations, audio captured by the microphones in the cameras 118 or the microphone device 124 may also be processed to identify audio features (e.g., a baby sound), and relevant signature events (e.g., a baby cry event) when the audio features meet predetermined criteria.

The smart home environment 100 may additionally or alternatively include one or more other occupancy sensors (e.g., the smart doorbell 106, smart door locks 120, touch screens, IR sensors, microphones, ambient light sensors, motion detectors, smart nightlights 170, etc.). In some implementations, the smart home environment 100 includes radio-frequency identification (RFID) readers (e.g., in each room 152 or a portion thereof) that determine occupancy based on RFID tags located on or embedded in occupants. For example, RFID readers may be integrated into the smart hazard detectors 104.

The smart home environment 100 may also include communication with devices outside of the physical home but within a proximate geographical range of the home. For example, the smart home environment 100 may include a pool heater monitor 114 that communicates a current pool temperature to other devices within the smart home environment 100 and/or receives commands for controlling the pool temperature. Similarly, the smart home environment 100 may include an irrigation monitor 116 that communicates information regarding irrigation systems within the smart home environment 100 and/or receives control information for controlling such irrigation systems.

By virtue of network connectivity, one or more of the smart home devices of FIG. 1 may further allow a user to interact with the device even if the user is not proximate to the device. For example, a user may communicate with a device using a computer (e.g., a desktop computer, laptop computer, or tablet) or other portable electronic device 166 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 100 using a network-connected computer or portable electronic device 166. In some examples, some or all of the occupants (e.g., individuals who live in the home) may register their device 166 with the smart home environment 100. Such registration may be made at a central server to authenticate the occupant and/or the device as being associated with the home and to give permission to the occupant to use the device to control the smart devices in the home. An occupant may use their registered device 166 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering devices 166, the smart home environment 100 may make inferences about which individuals live in the home and are therefore occupants and which devices 166 are associated with those individuals. As such, the smart home environment may "learn" who is an occupant and permit the devices 166 associated with those individuals to control the smart devices of the home.

In some implementations, in addition to containing processing and sensing capabilities, devices 102, 104, 106, 108, 110, 112, 114, 116, 118, 120, 122 and/or 124 (collectively referred to as "the smart devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 160) to a network, such as the Internet 162. Through the Internet 162, the smart devices may communicate with a smart home provider server system 164 (also called a central server system and/or a cloud-computing system herein). The smart home provider server system 164 may be associated with a manufacturer, support entity, or service provider associated with the smart device (s). In some implementations, a user is able to contact customer support using a smart device itself rather than needing to use other communication means, such as a telephone or Internet-connected computer. In some implementations, software updates are automatically sent from the smart home provider server system 164 to smart devices (e.g., when available, when purchased, or at routine intervals).

In some implementations, the network interface 160 includes a conventional network device (e.g., a router), and the smart home environment 100 of FIG. 1 includes a hub device 180 that is communicatively coupled to the network (s) 162 directly or via the network interface 160. The hub device 180 is further communicatively coupled to one or more of the above intelligent, multi-sensing, network-connected devices (e.g., smart devices of the smart home environment 100). Each of these smart devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled smart devices, configure the hub device to interoperate with smart devices newly introduced to the home network, commission new smart devices, and adjust or view settings of connected smart devices, etc. In some implementations the hub device extends capabilities of low capability smart device to match capabilities of the highly capable smart devices of the same type, integrates functionality of multiple different device types—even across different communication protocols, and is configured to streamline adding of new devices and commissioning of the hub device.

Figure 2:
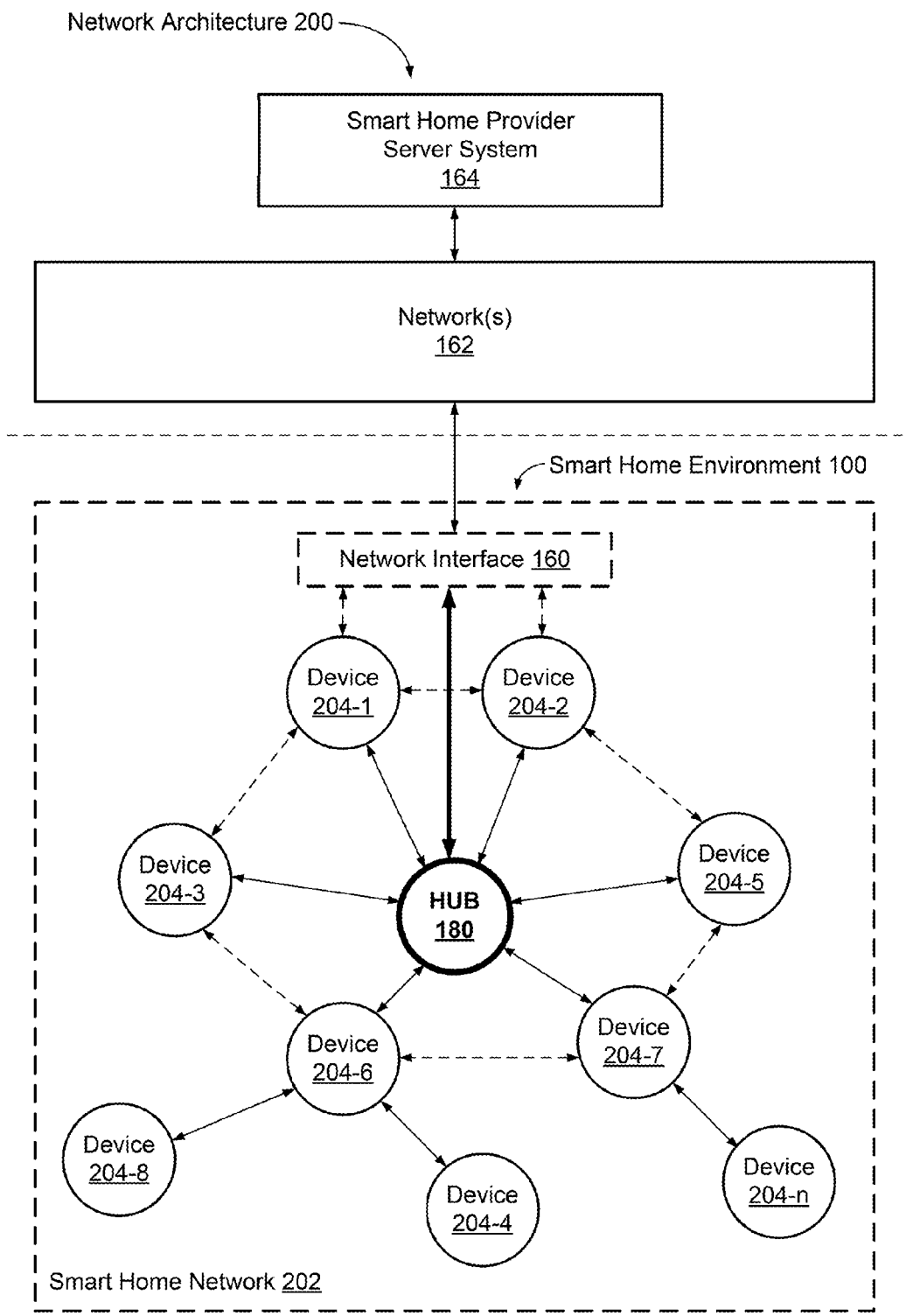
FIG. 2 is a block diagram illustrating an example network architecture that includes a smart home network, in accordance with some implementations.

FIG. 2 is a block diagram illustrating an example network architecture 200 that includes a smart home network 202 in accordance with some implementations. In some implementations, the smart devices 204 in the smart home environment 100 (e.g., devices 102, 104, 106, 108, 110, 112, 114, 116, 118, 120, 122 and/or 124) combine with the hub device 180 to create a mesh network in smart home network 202. In some implementations, one or more smart devices 204 in the smart home network 202 operate as a smart home controller. Additionally and/or alternatively, hub device 180 operates as the smart home controller. In some implementations, a smart home controller has more computing power than other smart devices. In some implementations, a smart home controller processes inputs (e.g., from smart devices 204, electronic device 166, and/or smart home provider server system 164) and sends commands (e.g., to smart devices 204 in the smart home network 202) to control operation of the smart home environment 100. In some implementations, some of the smart devices 204 in the smart home network 202 (e.g., in the mesh network) are "spokesman" nodes (e.g., 204-1) and others are "low-powered" nodes (e.g., 204-9). Some of the smart devices in the smart home environment 100 are battery powered, while others have a regular and reliable power source, such as by connecting to wiring (e.g., to 120V line voltage wires) behind the walls 154 of the smart home environment. The smart devices that have a regular and reliable power source are referred to as "spokesman" nodes. These nodes are typically equipped with the capability of using a wireless protocol to facilitate bidirectional communication with a variety of other devices in the smart home environment 100, as well as with the smart home provider server system 164. In some implementations, one or more "spokesman" nodes operate as a smart home controller. On the other hand, the devices that are battery powered are the "low-power" nodes. These nodes tend to be smaller than spokesman nodes and typically only communicate using wireless protocols that require very little power, such as Zigbee, 6LoWPAN, etc.

In some implementations, some low-power nodes are incapable of bidirectional communication. These low-power nodes send messages, but they are unable to "listen". Thus, other devices in the smart home environment 100, such as the spokesman nodes, cannot send information to these low-power nodes.

In some implementations, some low-power nodes are capable of only a limited bidirectional communication. For example, other devices are able to communicate with the low-power nodes only during a certain time period.

As described, in some implementations, the smart devices serve as low-power and spokesman nodes to create a mesh network in the smart home environment 100. In some implementations, individual low-power nodes in the smart home environment regularly send out messages regarding what they are sensing, and the other low-powered nodes in the smart home environment—in addition to sending out their own messages—forward the messages, thereby causing the messages to travel from node to node (i.e., device to device) throughout the smart home network 202. In some implementations, the spokesman nodes in the smart home network 202, which are able to communicate using a relatively high-power communication protocol, such as IEEE 802.11, are able to switch to a relatively low-power communication protocol, such as IEEE 802.15.4, to receive these messages, translate the messages to other communication protocols, and send the translated messages to other spokesman nodes and/or the smart home provider server system 164 (using, e.g., the relatively high-power communication protocol). Thus, the low-powered nodes using low-power communication protocols are able to send and/or receive messages across the entire smart home network 202, as well as over the Internet 162 to the smart home provider server system 164. In some implementations, the mesh network enables the smart home provider server system 164 to regularly receive data from most or all of the smart devices in the home, make inferences based on the data, facilitate state synchronization across devices within and outside of the smart home network 202, and send commands to one or more of the smart devices to perform tasks in the smart home environment.

As described, the spokesman nodes and some of the low-powered nodes are capable of "listening." Accordingly, users, other devices, and/or the smart home provider server system 164 may communicate control commands to the low-powered nodes. For example, a user may use the electronic device 166 (e.g., a smart phone) to send commands over the Internet to the smart home provider server system 164, which then relays the commands to one or more spokesman nodes in the smart home network 202. The spokesman nodes may use a low-power protocol to communicate the commands to the low-power nodes throughout the smart home network 202, as well as to other spokesman nodes that did not receive the commands directly from the smart home provider server system 164.

In some implementations, a smart nightlight 170 (FIG. 1), which is an example of a smart device 204, is a low-power node. In addition to housing a light source, the smart nightlight 170 houses an occupancy sensor, such as an ultrasonic or passive IR sensor, and an ambient light sensor, such as a photo resistor or a single-pixel sensor that measures light in the room. In some implementations, the smart nightlight 170 is configured to activate the light source when its ambient light sensor detects that the room is dark and when its occupancy sensor detects that someone is in the room. In other implementations, the smart nightlight 170 is simply configured to activate the light source when its ambient light sensor detects that the room is dark. Further, in some implementations, the smart nightlight 170 includes a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly (e.g., using the mesh network) from node to node (i.e., smart device to smart device) within the smart home network 202 as well as over the Internet 162 to the smart home provider server system 164.

Other examples of low-power nodes include battery-operated versions of the smart hazard detectors 104. These smart hazard detectors 104 are often located in an area without access to constant and reliable power and may include any number and type of sensors, such as smoke/fire/heat sensors (e.g., thermal radiation sensors), carbon monoxide/dioxide sensors, occupancy/motion sensors, ambient light sensors, ambient temperature sensors, humidity sensors, and the like. Furthermore, smart hazard detectors 104 may send messages that correspond to each of the respective sensors to the other devices and/or the smart home provider server system 164, such as by using the mesh network as described above.

Examples of spokesman nodes include smart doorbells 106, smart thermostats 102, smart wall switches 108, and smart wall plugs 110. These devices are often located near and connected to a reliable power source, and therefore may include more power-consuming components, such as one or more communication chips capable of bidirectional communication in a variety of protocols.

In some implementations, the smart home environment 100 includes service robots 168 (FIG. 1) that are configured to carry out, in an autonomous manner, any of a variety of household tasks.

As explained above with reference to FIG. 1, in some implementations, the smart home environment 100 of FIG. 1 includes a hub device 180 that is communicatively coupled to the network(s) 162 directly or via the network interface 160. The hub device 180 is further communicatively coupled to one or more of the smart devices using a radio communication network that is available at least in the smart home environment 100. Communication protocols used by the radio communication network include, but are not limited to, ZigBee, Z-Wave, Insteon, EuOcean, Thread, OSIAN, Bluetooth Low Energy and the like. In some implementations, the hub device 180 not only converts the data received from each smart device to meet the data format requirements of the network interface 160 or the network(s) 162, but also converts information received from the network interface 160 or the network(s) 162 to meet the data format requirements of the respective communication protocol associated with a targeted smart device. In some implementations, in addition to data format conversion, the hub device 180 further processes the data received from the smart devices or information received from the network interface 160 or the network(s) 162 preliminary. For example, the hub device 180 can integrate inputs from multiple sensors/connected devices (including sensors/devices of the same and/or different types), perform higher level processing on those inputs—e.g., to assess the overall environment and coordinate operation among the different sensors/devices—and/or provide instructions to the different devices based on the collection of inputs and programmed processing. It is also noted that in some implementations, the network interface 160 and the hub device 180 are integrated to one network device. Functionality described herein is representative of particular implementations of smart devices, control application(s) running on representative electronic device(s) (such as a smart phone), hub device(s) 180, and server(s) coupled to hub device(s) via the Internet or other Wide Area Network. All or a portion of this functionality and associated operations can be performed by any elements of the described system—for example, all or a portion of the functionality described herein as being performed by an implementation of the hub device can be performed, in different system implementations, in whole or in part on the server, one or more connected smart devices and/or the control application, or different combinations thereof.

Figure 3:
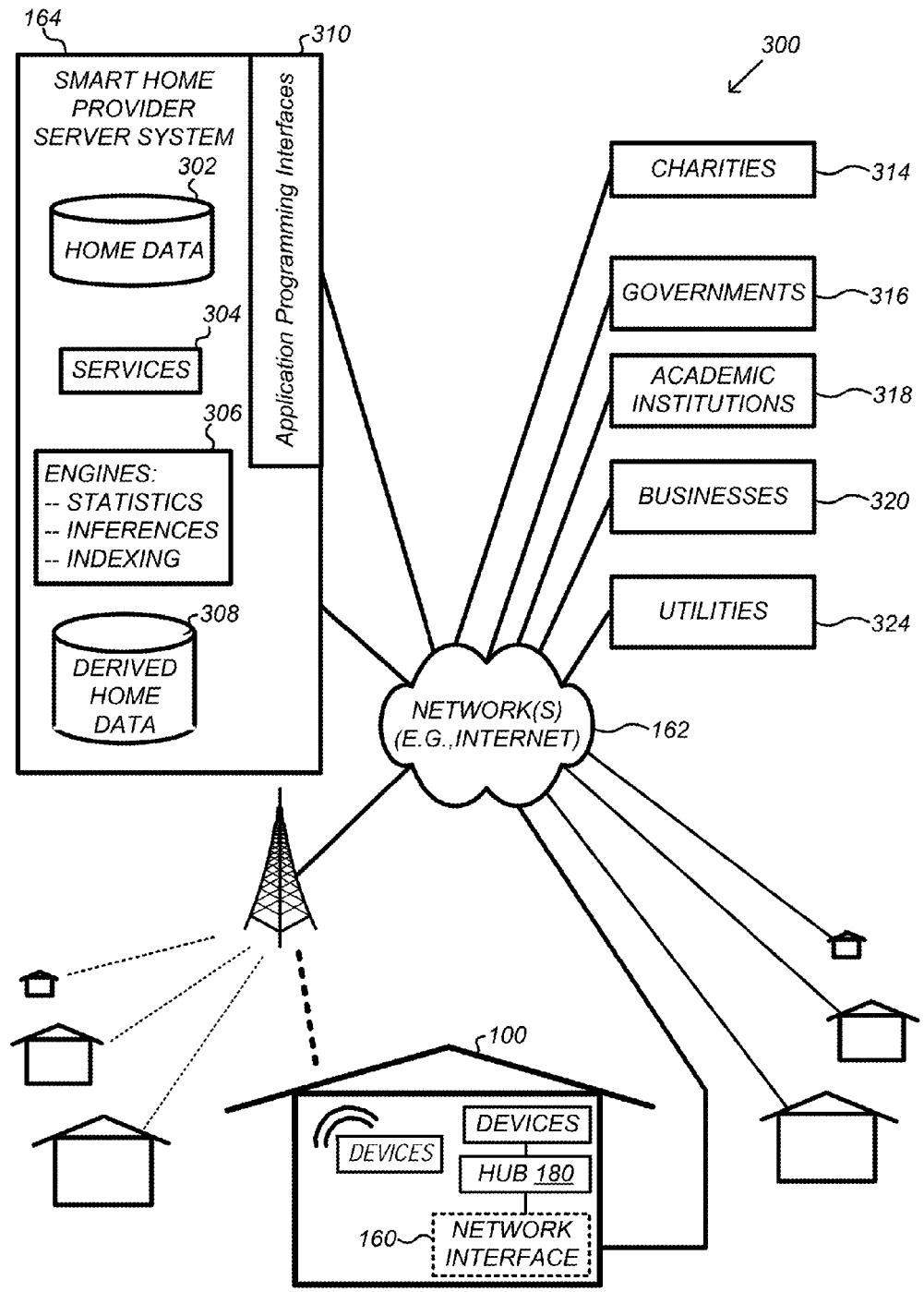
FIG. 3 illustrates a network-level view of an extensible devices and services platform with which the smart home environment of FIG. 1 is integrated, in accordance with some implementations.

FIG. 3 illustrates a network-level view of an extensible devices and services platform with which the smart home environment of FIG. 1 is integrated, in accordance with some implementations. The extensible devices and services platform 300 includes smart home provider server system 164. Each of the intelligent, network-connected devices described with reference to FIG. 1 (e.g., 102, 104, 106, 108, 110, 112, 114, 116 and 118, identified simply as "devices" in FIGS. 2-4) may communicate with the smart home provider server system 164. For example, a connection to the Internet 162 may be established either directly (for example, using 3G/4G connectivity to a wireless carrier), or through a network interface 160 (e.g., a router, switch, gateway, hub device, or an intelligent, dedicated whole-home controller node), or through any combination thereof.

In some implementations, the devices and services platform 300 communicates with and collects data from the smart devices of the smart home environment 100. In addition, in some implementations, the devices and services platform 300 communicates with and collects data from a plurality of smart home environments across the world. For example, the smart home provider server system 164 collects home data 302 from the devices of one or more smart home environments 100, where the devices may routinely transmit home data or may transmit home data in specific instances (e.g., when a device queries the home data 302). Example collected home data 302 includes, without limitation, power consumption data, blackbody radiation data, occupancy data, HVAC settings and usage data, carbon monoxide levels data, carbon dioxide levels data, volatile organic compounds levels data, sleeping schedule data, cooking schedule data, inside and outside temperature humidity data, television viewership data, inside and outside noise level data, pressure data, video data, etc.

In some implementations, the smart home provider server system 164 provides one or more services 304 to smart homes and/or third parties. Example services 304 include, without limitation, software updates, customer support, sensor data collection/logging, remote access, remote or distributed control, and/or use suggestions (e.g., based on collected home data 302) to improve performance, reduce utility cost, increase safety, etc. In some implementations, data associated with the services 304 is stored at the smart home provider server system 164, and the smart home provider server system 164 retrieves and transmits the data at appropriate times (e.g., at regular intervals, upon receiving a request from a user, etc.).

In some implementations, the extensible devices and services platform 300 includes a processing engine 306, which may be concentrated at a single server or distributed among several different computing entities without limitation. In some implementations, the processing engine 306 includes engines configured to receive data from the devices of smart home environments 100 (e.g., via the Internet 162 and/or a network interface 160), to index the data, to analyze the data and/or to generate statistics based on the analysis or as part of the analysis. In some implementations, the analyzed data is stored as derived home data 308.

Results of the analysis or statistics may thereafter be transmitted back to the device that provided home data used to derive the results, to other devices, to a server providing a webpage to a user of the device, or to other non-smart device entities. In some implementations, usage statistics, usage statistics relative to use of other devices, usage patterns, and/or statistics summarizing sensor readings are generated by the processing engine 306 and transmitted. The results or statistics may be provided via the Internet 162. In this manner, the processing engine 306 may be configured and programmed to derive a variety of useful information from the home data 302. A single server may include one or more processing engines.

The derived home data 308 may be used at different granularities for a variety of useful purposes, ranging from explicit programmed control of the devices on a per-home, per-neighborhood, or per-region basis (for example, demand-response programs for electrical utilities), to the generation of inferential abstractions that may assist on a per-home basis (for example, an inference may be drawn that the homeowner has left for vacation and so security detection equipment may be put on heightened sensitivity), to the generation of statistics and associated inferential abstractions that may be used for government or charitable purposes. For example, processing engine 306 may generate statistics about device usage across a population of devices and send the statistics to device users, service providers or other entities (e.g., entities that have requested the statistics and/or entities that have provided monetary compensation for the statistics).

In some implementations, to encourage innovation and research and to increase products and services available to users, the devices and services platform 300 exposes a range of application programming interfaces (APIs) 310 to third parties, such as charities 314, governmental entities 316 (e.g., the Food and Drug Administration or the Environmental Protection Agency), academic institutions 318 (e.g., university researchers), businesses 320 (e.g., providing device warranties or service to related equipment), utility companies 324, and other third parties. The APIs 310 are coupled to and permit third-party systems to communicate with the smart home provider server system 164, including the services 304, the processing engine 306, the home data 302, and the derived home data 308. In some implementations, the APIs 310 allow applications executed by the third parties to initiate specific data processing tasks that are executed by the smart home provider server system 164, as well as to receive dynamic updates to the home data 302 and the derived home data 308.

For example, third parties may develop programs and/or applications (e.g., web applications or mobile applications) that integrate with the smart home provider server system 164 to provide services and information to users. Such programs and applications may be, for example, designed to help users reduce energy consumption, to preemptively service faulty equipment, to prepare for high service demands, to track past service performance, etc., and/or to perform other beneficial functions or tasks.

Figure 4:
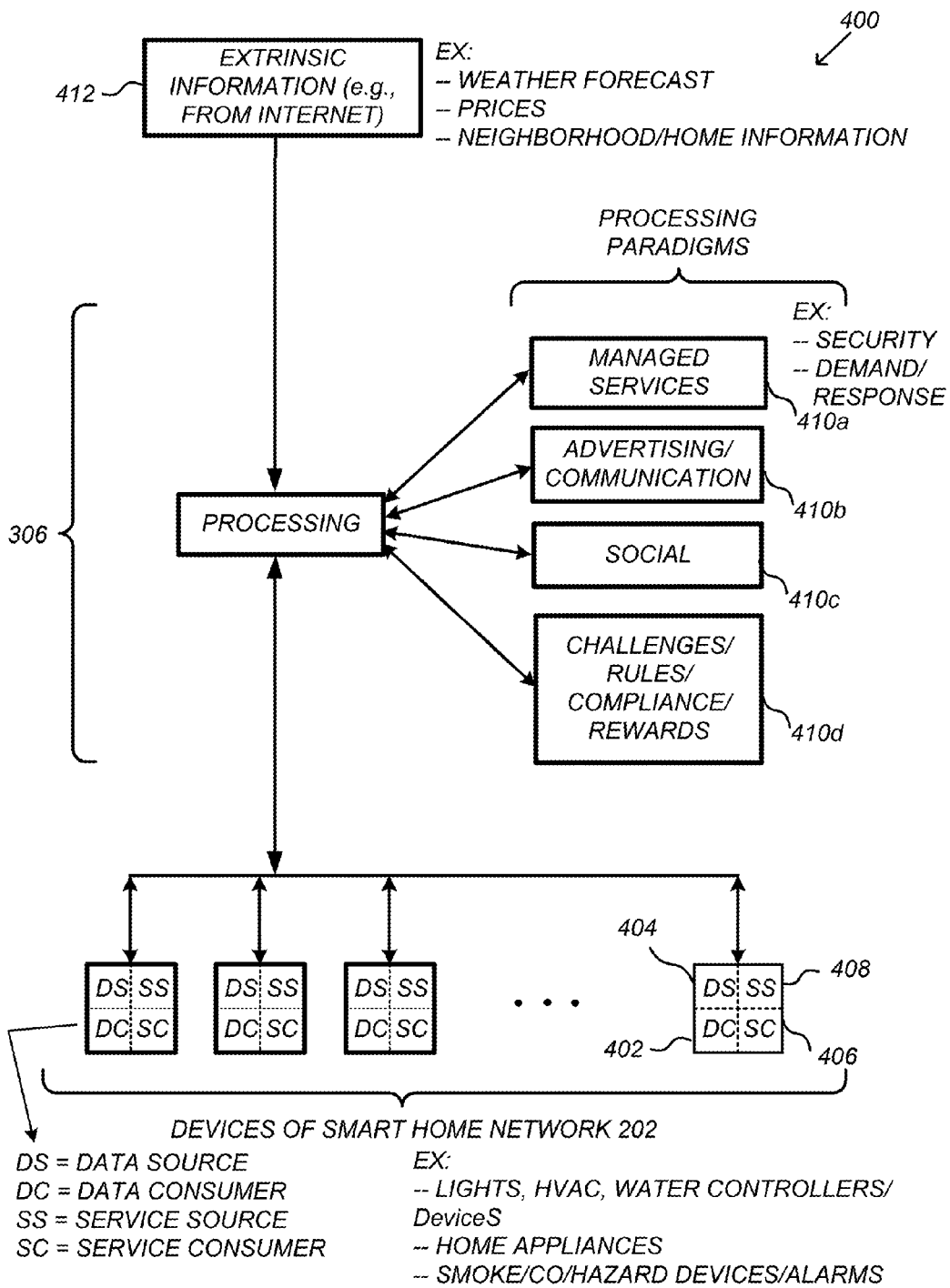
FIG. 4 illustrates an abstracted functional view of the extensible devices and services platform of FIG. 3, with reference to a processing engine as well as devices of the smart home environment, in accordance with some implementations.

FIG. 4 illustrates an abstracted functional view 400 of the extensible devices and services platform 300 of FIG. 3, with reference to a processing engine 306 as well as devices of the smart home environment, in accordance with some implementations. Even though devices situated in smart home environments will have a wide variety of different individual capabilities and limitations, the devices may be thought of as sharing common characteristics in that each device is a data consumer 402 (DC), a data source 404 (DS), a services consumer 406 (SC), and a services source 408 (SS). Advantageously, in addition to providing control information used by the devices to achieve their local and immediate objectives, the extensible devices and services platform 300 may also be configured to use the large amount of data that is generated by these devices. In addition to enhancing or optimizing the actual operation of the devices themselves with respect to their immediate functions, the extensible devices and services platform 300 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

FIG. 4 shows processing engine 306 as including a number of processing paradigms 410. In some implementations, processing engine 306 includes a managed services paradigm 410a that monitors and manages primary or secondary device functions. The device functions may include ensuring proper operation of a device given user inputs, estimating that (e.g., and responding to an instance in which) an intruder is or is attempting to be in a dwelling, detecting a failure of equipment coupled to the device (e.g., a light bulb having burned out), implementing or otherwise responding to energy demand response events, providing a heat-source alert, and/or alerting a user of a current or predicted future event or characteristic. In some implementations, processing engine 306 includes an advertising/communication paradigm 410b that estimates characteristics (e.g., demographic information), desires and/or products of interest of a user based on device usage. Services, promotions, products or upgrades may then be offered or automatically provided to the user. In some implementations, processing engine 306 includes a social paradigm 410c that uses information from a social network, provides information to a social network (for example, based on device usage), and/or processes data associated with user and/or device interactions with the social network platform. For example, a user's status as reported to their trusted contacts on the social network may be updated to indicate when the user is home based on light detection, security system inactivation or device usage detectors. As another example, a user may be able to share device-usage statistics with other users. In yet another example, a user may share HVAC settings that result in low power bills and other users may download the HVAC settings to their smart thermostat 102 to reduce their power bills.

In some implementations, processing engine 306 includes a challenges/rules/compliance/rewards paradigm 410d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to efforts to conserve energy, to live safely (e.g., reducing the occurrence of heat-source alerts) (e.g., reducing exposure to toxins or carcinogens), to conserve money and/or equipment life, to improve health, etc. For example, one challenge may involve participants turning down their thermostat by one degree for one week. Those participants that successfully complete the challenge are rewarded, such as with coupons, virtual currency, status, etc. Regarding compliance, an example involves a rental-property owner making a rule that no renters are permitted to access certain owner's rooms. The devices in the room having occupancy sensors may send updates to the owner when the room is accessed.

In some implementations, processing engine 306 integrates or otherwise uses extrinsic information 412 from extrinsic sources to improve the functioning of one or more processing paradigms. Extrinsic information 412 may be used to interpret data received from a device, to determine a characteristic of the environment near the device (e.g., outside a structure that the device is enclosed in), to determine services or products available to the user, to identify a social network or social-network information, to determine contact information of entities (e.g., public-service entities such as an emergency-response team, the police or a hospital) near the device, to identify statistical or environmental conditions, trends or other information associated with a home or neighborhood, and so forth.

Figure 5:
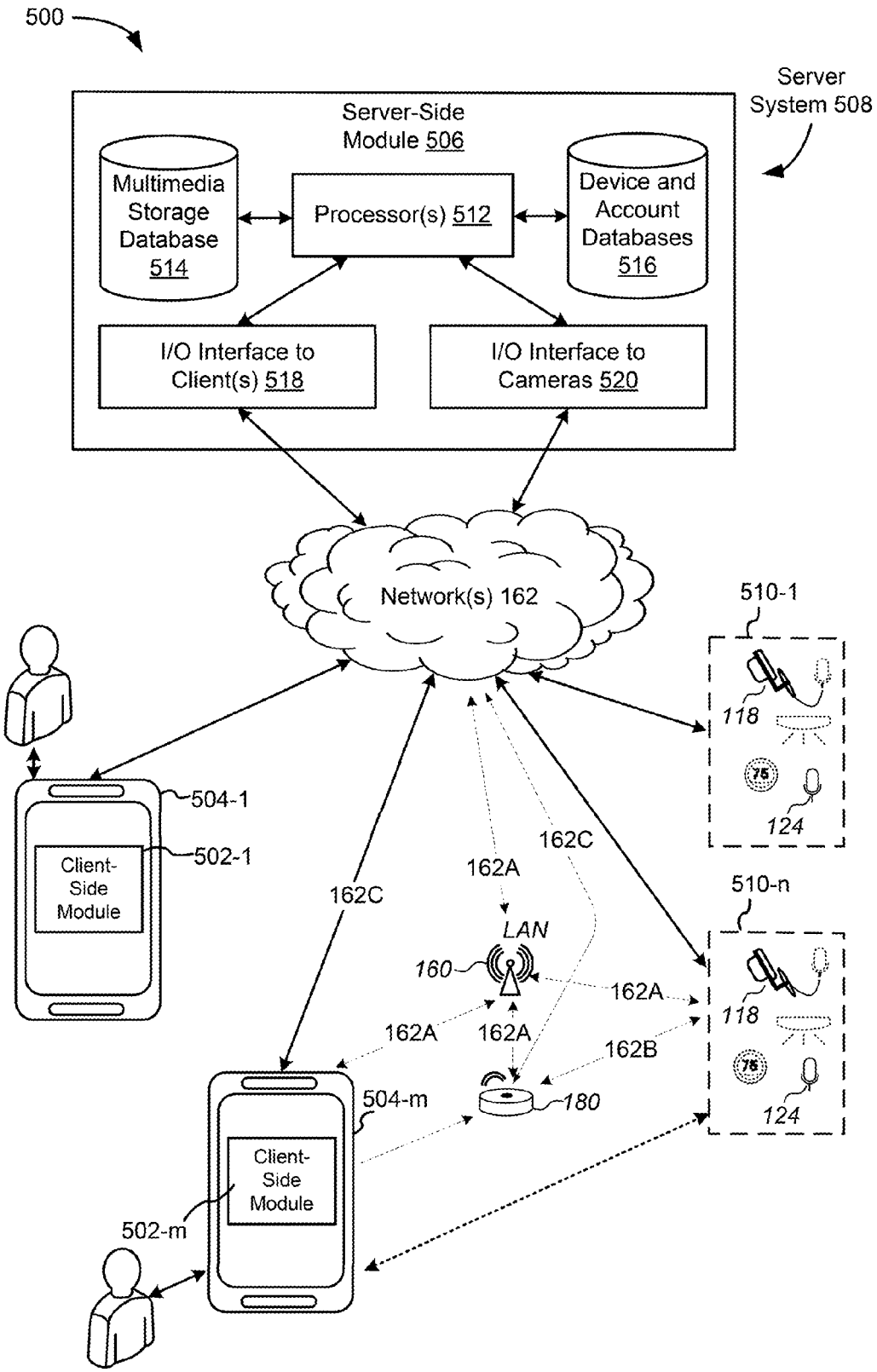
FIG. 5 is a representative operating environment in which a server system interacts with client devices and smart devices of the smart home environment in accordance with some implementations.

FIG. 5 is a representative operating environment 500 in which a server system interacts with client devices and smart devices of the smart home environment in accordance with some implementations. In the operating environment 500, a server system 508 provides data processing for monitoring and facilitating review of motion/sound events in multimedia data streams (e.g., video and audio data) captured by video cameras 118 or the microphone devices 124. As shown in FIG. 5, the server system 508 receives multimedia data from electronic devices 510 (e.g., cameras 118 and microphones 124) located at various physical locations (e.g., inside homes, restaurants, stores, streets, parking lots, and/or the smart home environments 100 of FIG. 1). Each electronic device 510 may be bound to one or more reviewer accounts, and the server system 508 provides video/audio monitoring data for the electronic device 510 to client devices 504 associated with the reviewer accounts. For example, the portable electronic device 166 is an example of the client device 504.

In some implementations, the smart home provider server system 164 or a component thereof serves as the server system 508. In some implementations, the smart home environment relies on a hub device 180 to manage smart devices located within the smart home environment, and a hub device server system associated with the hub device 180 servers as the server system 508. In some implementations, the server system 508 is a dedicated multimedia data processing server that provides multimedia data processing services to electronic devices 510 and client devices 504 independent of other services provided by the server system 508.

In some implementations, each of the electronic devices 510 includes one or more electronic devices 510 that capture multimedia data (video and/or audio) and send the captured multimedia data to the server system 508 substantially in real-time. In some implementations, each of the electronic devices 510 optionally includes a controller device (not shown) that serves as an intermediary between the respective electronic device 510 and the server system 508. The controller device receives the multimedia data from the one or more electronic devices 510, optionally, performs some preliminary processing on the multimedia data, and sends the multimedia data to the server system 508 on behalf of the one or more electronic devices 510 substantially in real-time. In some implementations, each camera 118 or microphone 124 has its own on-board processing capabilities to perform some preliminary processing on the captured video data before sending the processed video data (along with metadata obtained through the preliminary processing) to the controller device and/or the server system 508. In some implementations, the client device 504 located in the smart home environment functions as the controller device to at least partially process the captured multimedia data.

As shown in FIG. 5, in accordance with some implementations, each of the client devices 504 includes a client-side module 502. The client-side module 502 communicates with a server-side module 506 executed on the server system 508 through the one or more networks 162. The client-side module 502 provides client-side functionalities for the event monitoring and review processing and communications with the server-side module 506. The server-side module 506 provides server-side functionalities for event monitoring and review processing for any number of client-side modules 502 each residing on a respective client device 504. The server-side module 506 also provides server-side functionalities for video processing and electronic device control for any number of the electronic devices 510, including any number of control devices and the cameras 118.

In some implementations, the server-side module 506 includes one or more processors 512, a multimedia storage database 514, device and account databases 516, an I/O interface to one or more client devices 518, and an I/O interface to one or more video sources 520. The I/O interface to one or more clients 518 facilitates the client-facing input and output processing for the server-side module 506. The device and account databases 516 store a plurality of profiles for reviewer accounts registered with the video processing server, where a respective user profile includes account credentials for a respective reviewer account, and one or more electronic devices 510 linked to the respective reviewer account. In some implementations, the respective user profile of each review account includes information related to capabilities, ambient sound characteristics, and one or more classifier models for the electronic devices 510 linked to the respective reviewer account. The I/O interface to one or more video sources 520 facilitates communications with one or more electronic devices 510 (e.g., groups of one or more cameras 118 and associated controller devices). The multimedia storage database 514 stores raw or processed multimedia data received from the electronic devices 510, as well as various types of metadata, such as classifier models, training data, motion or audio events, event categories, event category models, event filters, and event masks, for use in data processing for event monitoring and review for each reviewer account.

Examples of a representative client device 504 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, a point-of-sale (POS) terminal, vehicle-mounted computer, an ebook reader, or a combination of any two or more of these data processing devices or other data processing devices.

Examples of the one or more networks 162 include local area networks (LAN) and wide area networks (WAN) such as the Internet. The one or more networks 162 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some implementations, the server system 508 is implemented on one or more standalone data processing apparatuses or a distributed network of computers. In some implementations, the server system 508 also employs various virtual devices and/or services of third party service providers (e.g., third-party cloud service providers) to provide the underlying computing resources and/or infrastructure resources of the server system 508. In some implementations, the server system 508 includes, but is not limited to, a handheld computer, a tablet computer, a laptop computer, a desktop computer, or a combination of any two or more of these data processing devices or other data processing devices.

The server-client environment 500 shown in FIG. 1 includes both a client-side portion (e.g., the client-side module 502) and a server-side portion (e.g., the server-side module 506). The division of functionalities between the client and server portions of operating environment 500 can vary in different implementations. Similarly, the division of functionalities between the electronic device 510 and the server system 508 can vary in different implementations. For example, in some implementations, client-side module 502 is a thin-client that provides only user-facing input and output processing functions, and delegates all other data processing functionalities to a backend server (e.g., the server system 508). Similarly, in some implementations, a respective one of the electronic devices 510 is a simple video capturing device that continuously captures and streams video data to the server system 508 with limited local preliminary processing on the video data. Although many aspects of the present technology are described from the perspective of an electronic device (e.g., the electronic devices 510), the corresponding actions performed by the client device 504 and/or the server system 508 would be apparent to ones skilled in the art without any creative efforts. Similarly, some aspects of the present technology may be described from the perspective of the client device or the server system, and the corresponding actions performed by the server system would be apparent to ones skilled in the art without any creative efforts. Furthermore, some aspects of the present technology may be performed by the server system 508, the client device 504, and the electronic devices 510 cooperatively.

It should be understood that operating environment 500 that involves the server system 508, the video cameras 118, and the microphone device 124 is merely an example. Many aspects of operating environment 500 are generally applicable in other operating environments in which a server system provides data processing for monitoring and facilitating review of data captured by other types of electronic devices (e.g., smart thermostats 102, smart hazard detectors 104, smart doorbells 106, smart wall plugs 110, appliances 112 and the like).

The electronic devices, the client devices or the server system communicate with each other using the one or more communication networks 162. In an example smart home environment, two or more devices (e.g., the network interface device 160, the hub device 180, the client devices 504-*m* and the electronic devices) are located in close proximity to each other, such that they can be communicatively coupled in the same sub-network 162A via wired connections, a WLAN or a Bluetooth Personal Area Network (PAN). The Bluetooth PAN is optionally established based on classical Bluetooth technology or Bluetooth Low Energy (BLE) technology. Thus, in some implementations, each of the hub device 180, the client device 504-*m*, and the electronic devices is communicatively coupled to the networks 162 via the network interface device 160.

This smart home environment further includes one or more other radio communication networks 162B through which at least some of the electronic devices of the electronic devices 510-*n* exchange data with the hub device 180. Optionally, the hub device 180 is communicatively coupled directly to the networks 162. Optionally, the hub device 180 is communicatively coupled indirectly to the networks 162 via the network interface device 160. Stated another way, during normal operation, the network interface device 160 and the hub device 180 communicate with each other to form a network gateway through which data are exchanged with the electronic device of the electronic devices 510-*n*.

In some implementations (e.g., in the network 162C), both the client device 504-*m* and the electronic devices of the electronic devices 510-*n* communicate directly via the network(s) 162 without passing the network interface device 160 or the hub device 180.

Figure 6:
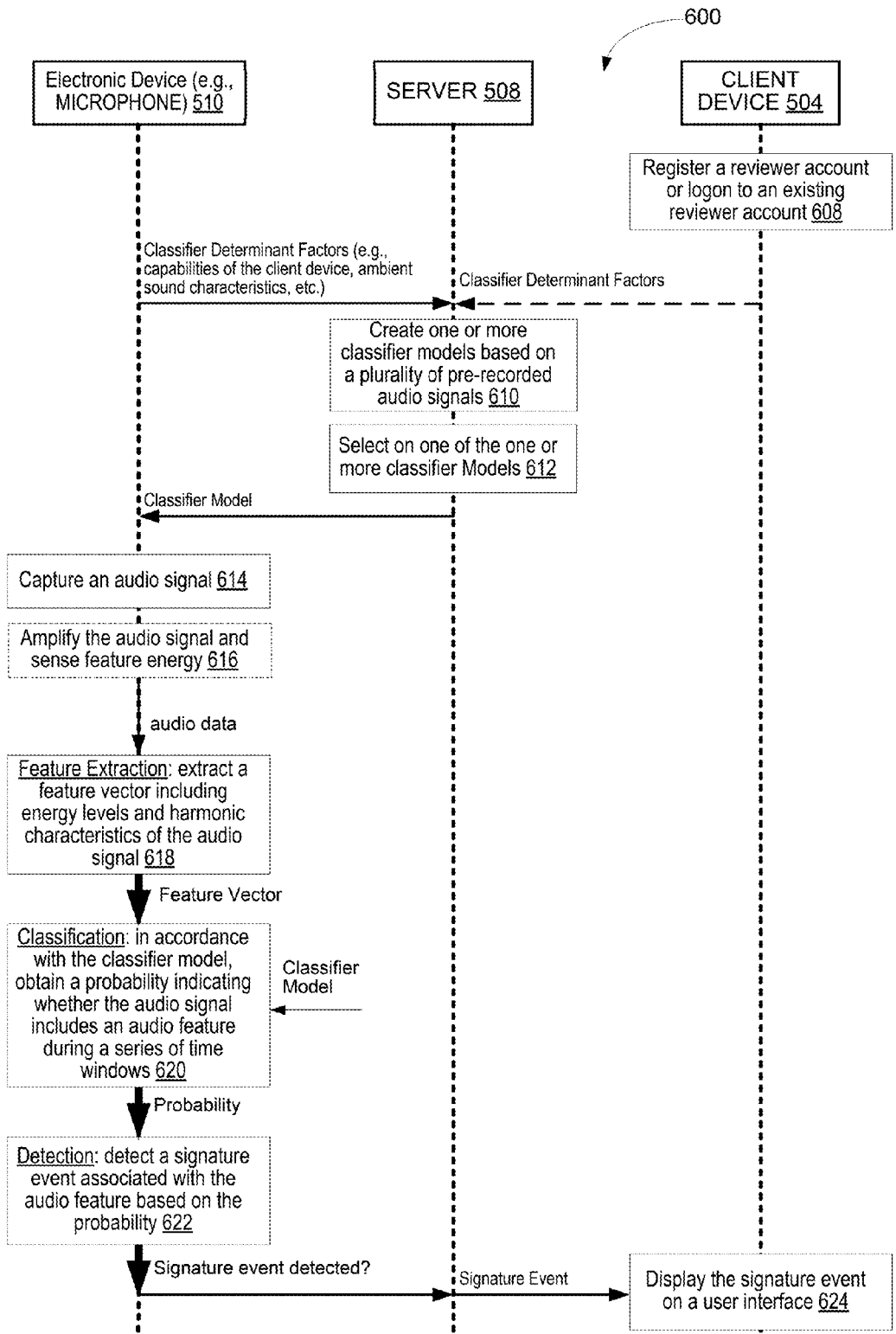
FIG. 6 is a flow diagram illustrating a process of detecting a signature audio event in an operating environment as shown in FIG. 5 in accordance with some implementations.

FIG. 6 is a flow diagram illustrating a process 600 of detecting a signature audio event in an operating environment 500 as shown in FIG. 5 in accordance with some implementations. The operating environment 500 includes an electronic device 510, a client device 504 and a server system 508. Optionally, the electronic device 510 is a stand-alone acoustic-to-electric transducer device. Optionally, the electronic device 510 is an acoustic-to-electric transducer integrated in another electronic device (e.g., a video camera 118). Optionally, the electronic device 510 further includes a microphone, and is part of the client device 504. In some implementations, when the electronic device 510 is not part of the client device 504, it is located in proximity to the client device 504 (e.g., in the same physical area that can be covered by a short range or local area wireless network).

In some implementations, the electronic device 510 functions as a main platform (i.e., applies its computational capability) to process an audio signal locally and/or detect a predetermined signature audio event according to a classifier model provided by the server system 508. The client device 504 maintains graphic user interfaces (GUIs) to manage and monitor this audio event detection process 600. Specifically, the GUIs are rendered on a display of the client device 504 by a client-side application that implements one or features of the client-side modules 502 described in reference to FIG. 15. When the electronic device 510 is integrated in a video camera 118, the GUIs are integrated as part of the GUIs for controlling the video camera 118 and monitoring multimedia data captured by the video camera 118.

Prior to detecting a specific audio feature (e.g., baby sound) at the electronic device 510, a user registers (608) a reviewer account on a client-side application associated with the electronic device 510, and the reviewer account is configured to be associated with one or more electronic devices 510. Optionally, the client device 504 tracks a plurality of classifier determinant factors associated with the electronic device 510, and provides them to the server system 508. Optionally, the electronic device 510 provides the plurality of classifier determinant factors to the server system 508 by itself. The classifier determinant factors include, but are not limited to, capabilities of the client device 504, and ambient sound characteristics of the client device 504. Example capabilities of the electronic device 510 include its computational, caching, storage and communication capabilities. Ambient sound characteristics are associated with ambient noises and alternative audio features that the audio feature needs to be distinguished from. In some implementations, when the specific audio feature is associated with baby sound, and the ambient noises in the smart home environment is often caused by refrigerators, air conditioning systems, dish washers, or televisions. The alternative audio features that need to be distinguished from the baby sound include dog barks, adult conversation, lullabies, music, sirens, and train horns.

Upon receiving the classifier determinant factors, the server system 508 creates (610) one or more classifier models based on these determinant factors and a plurality of pre-recorded audio signals. The plurality of pre-recorded audio signals are used as training data for the purposes of creating the classifier models, and include some pre-recorded ambient noises and alternative audio features that substantially reflect the ambient sound characteristics of the electronic device 510. The classifier model is intended to take into account the capabilities of the electronic device 510, the sound characteristics of the specific audio feature, and the ambient sound characteristics of the client device, such that the electronic device 510 can use the classifier model to detect the specific audio feature from the ambient noises and the alternative audio features promptly and accurately. As such, in some implementations, the classifier models are adaptively determined by the server system 508 at least according to an ambient noise level, the specific audio feature that needs to be detected, the alternative audio features that the specific feature needs to be distinguished from, the quality of the pre-recorded training audio signals, and the capabilities of the electronic device 510. Typically, generation of such adaptive classifier models demands relatively large amount of computational resources, and therefore, is preferably implemented at the server system 508.

In some implementations, after generating the classifier models, the server system 508 selects (612) one of the classifier models and returns it to the electronic device 510. The electronic device 510 stores (614) the received classifier model in a local memory. In some implementations, the server system 508 updates the one or more classifier models according to any update of the classifier determinant factors, and provides the updated classifier model to the electronic device 510. Upon receiving the classifier model, the electronic device 510 updates the classifier model that has been stored in its local memory. This updated classifier model reflects the update of the classifier determinant factors associated with a change of its capabilities of the client device 106 or a variation of the ambient sound characteristics). Given the updated classifier model, the electronic device 510 would maintain an accurate and prompt audio event detection process that tracks the update of the classifier determinant factors.

The electronic device 510 captures (614) an audio signal in the smart home environment, and converts the audio signal to audio data. The audio data associated with the audio signal are then processed for identifying a audio feature and a corresponding signature event. In some implementations, prior to feeding the audio data for feature extraction, the electronic device 510 amplifies (616) the audio signal using automatic gain control, and senses an energy level of the audio feature. When the energy level of the audio feature indicates that the audio feature is buried within background noise (i.e., the corresponding signal to noise ratio is low), the electronic device 504 forgoes the following operations 618-622.

The electronic device 510 is configured to sequentially implement operations 618-622 (feature extraction, feature classification and event detection) on the received audio data. Specifically, the electronic device 510 extracts (618) a feature vector from the acoustic sound, and elements of the feature vector are arranged according to the classifier model applied in the subsequent feature classification operation 620. In some implementations, the feature vector includes energy levels and harmonic characteristics of the audio signal at one or more frequencies or frequency bands. In some implementations, relevant audio features are extracted to help differentiate baby sound from alternative audio features. Optionally, a time domain approach or a frequency domain approach can be applied to extract the feature vector. More details on the time domain and frequency domain approaches are explained below with reference to FIGS. 9 and 11, respectively.

In some implementations, the classifier model is selected from a group consisting of: a neural network, a linear support vector machine (SVM), a naïve Bayes classifier, a Gaussian Mixture Model.

After obtaining the feature vector, the electronic device 510 generates (620) a probability value based on the feature vector and the classifier model, where the probability value indicates whether the audio signal includes the specific audio feature during a series of time windows. Given that the classifier model is adaptively generated by the server system 508 according to the capabilities and the ambient sound characteristics of the electronic device 510, the electronic device 510 can implement the feature extraction and classification operations 618 and 620 efficiently while reserving its computational resources.

In accordance with predetermined event detection criteria, the electronic device 510 further detects (622) a signature event associated with the specific audio feature based on the generated probability value. In some implementations, the electronic device 510 sends a notice acknowledging the detection of the signature event to the server system 606, which forwards the notice to the client device 504. The client device 504 then creates an event alert for a user of the reviewer account associated with the electronic device 510 (e.g., displays (624) the signature event on the GUI of the electronic device 510). More details on the event detection operation 622 are explained below with reference to FIGS. 12 and 13.

Figure 17B:
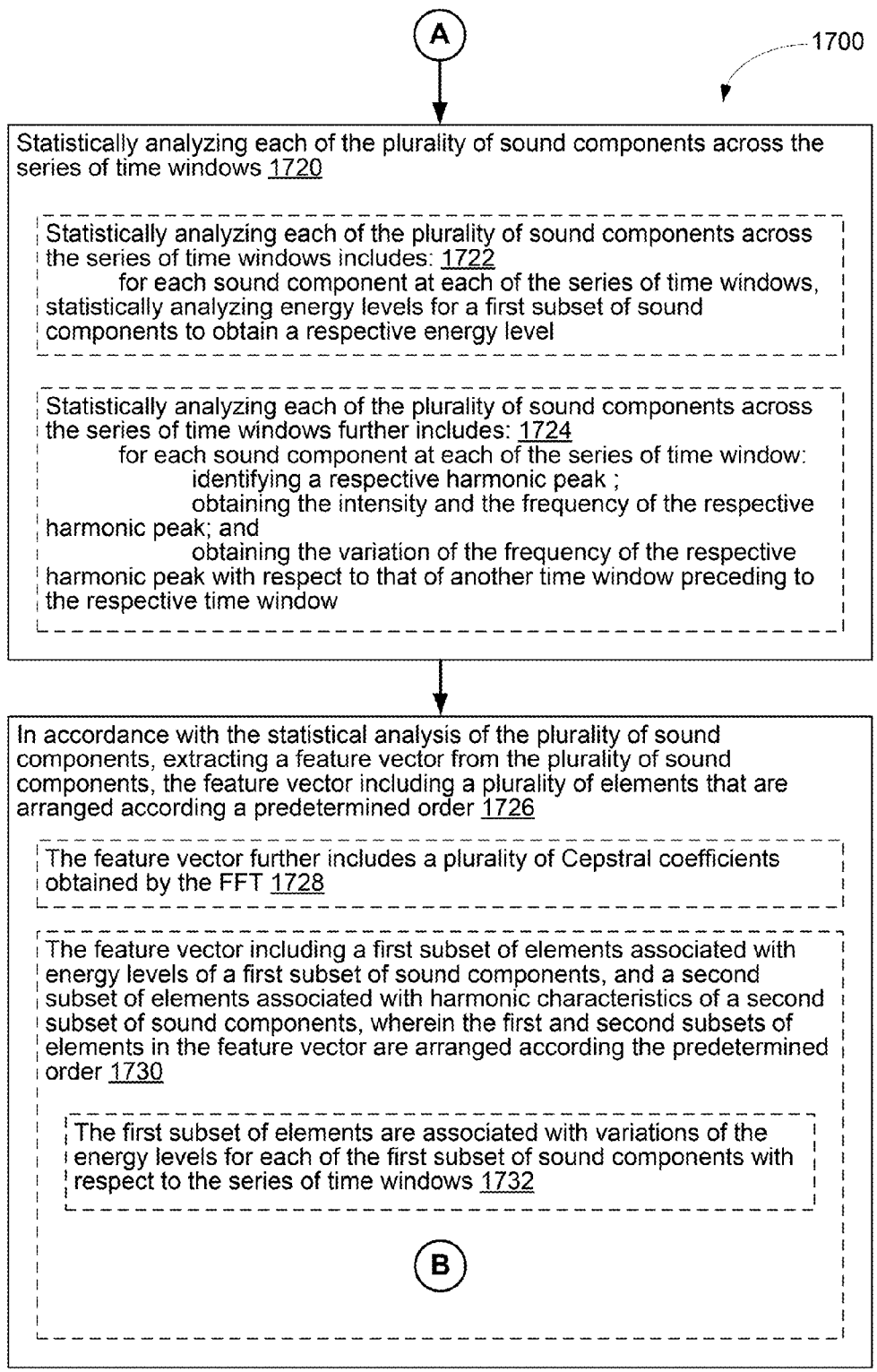
Figure 17D:
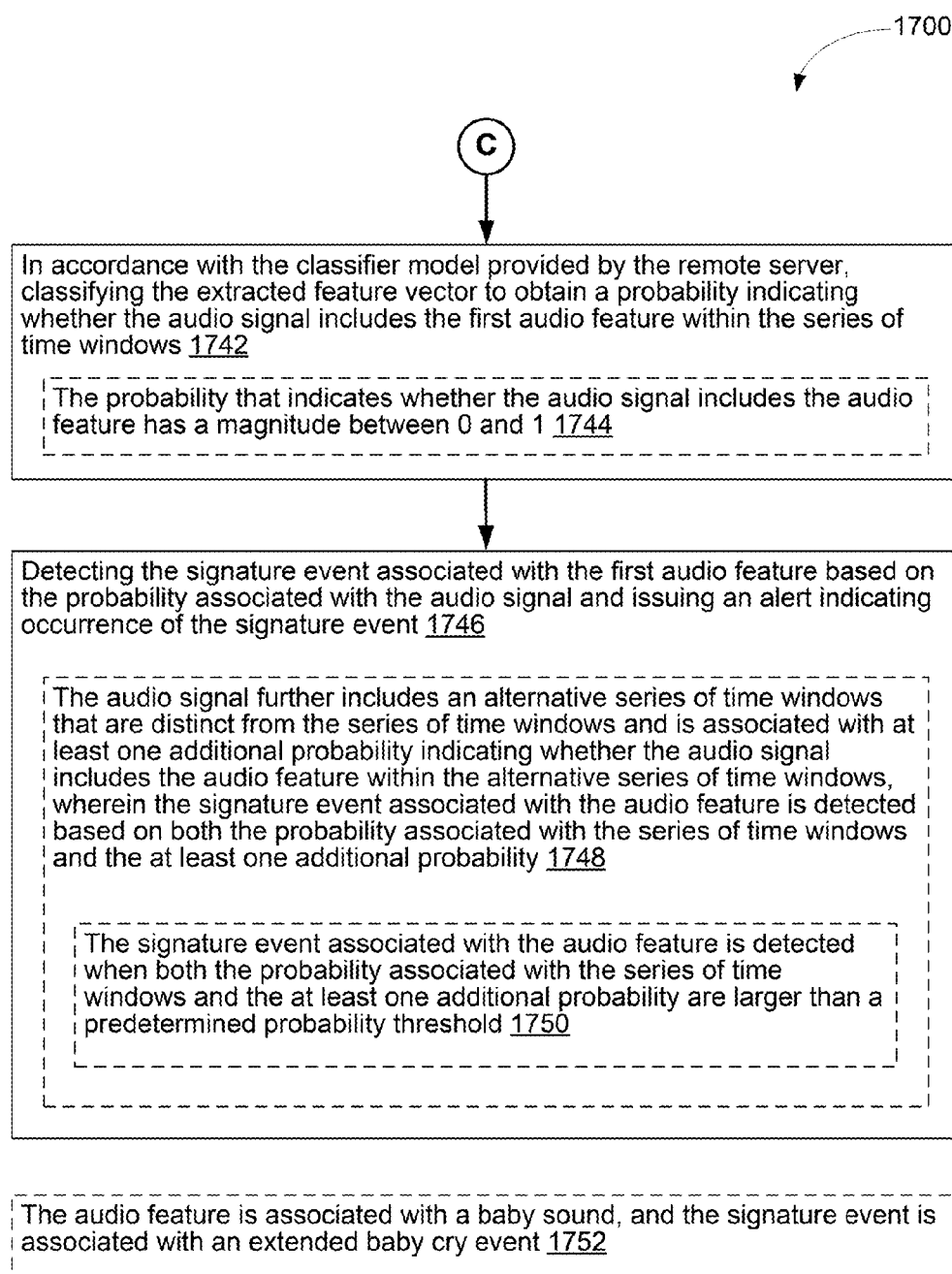

It should be understood that the particular order in which the operations in FIG. 6 are shown and have been described is merely an example and is not intended to indicate that the described order is the only order in which the operations can be performed. One of ordinary skill in the art would recognize various ways to detect the signature audio event as described herein. Additionally, it should be noted that details of other processes described herein with respect to the event detection process 600 (e.g., FIG. 6) are also applicable in an analogous manner to the system architecture 702 for audio event detection and the event detection method 1700 described above with respect to FIGS. 7 and 17, respectively.

Figure 7:
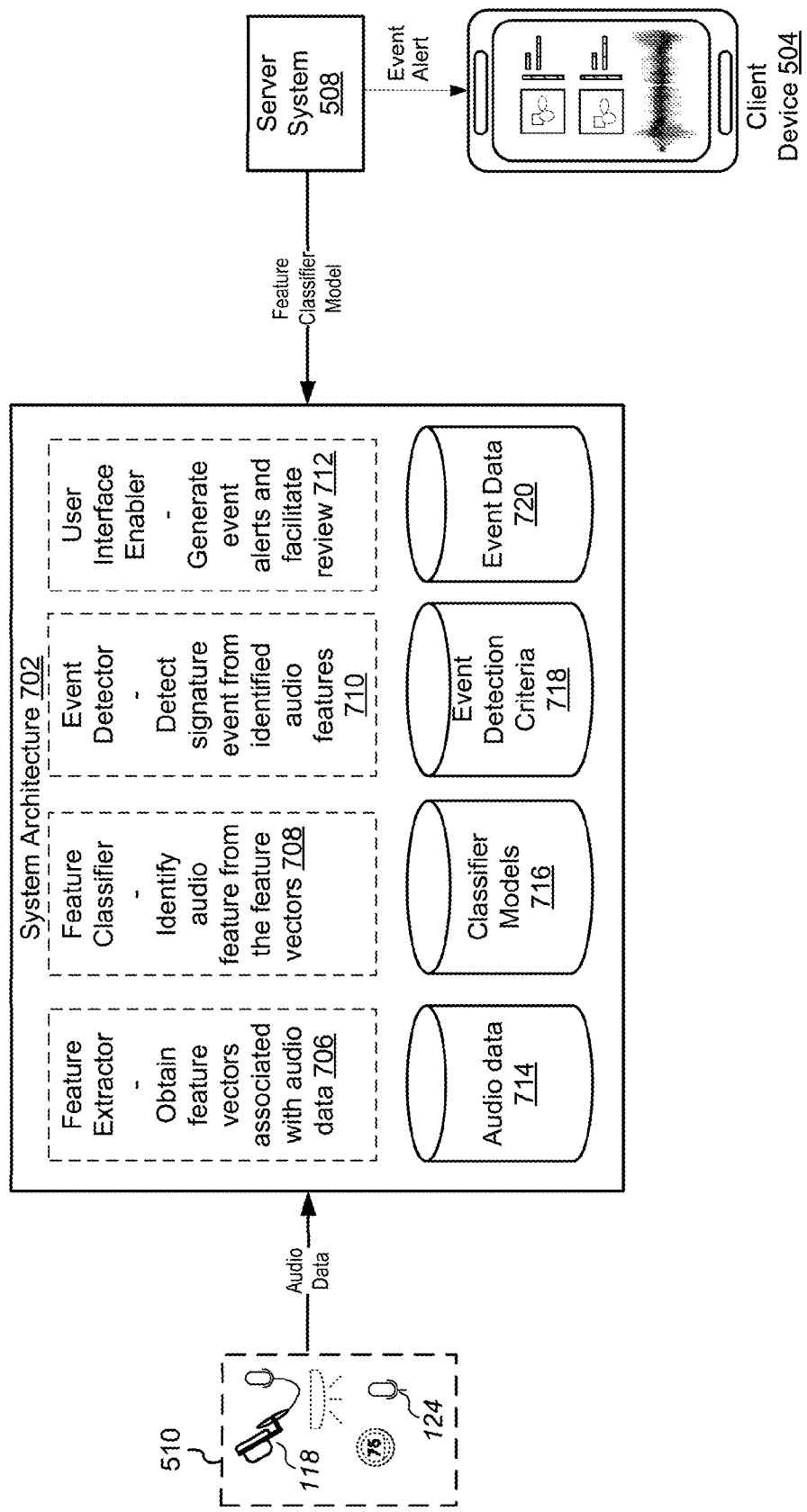
FIG. 7 is example system architecture for audio event detection in accordance with some implementations.

FIG. 7 is example system architecture 702 for audio event detection in accordance with some implementations. The system architecture 702 processes a live audio feed received from an electronic device 510 (e.g., a camera 118 and a microphone device 124) in real-time to identify signature audio events in the live audio feed, and generates real-time event alerts. In some implementations, the real-time alerts are generated on a client device 504 associated with a reviewer account bound to the electronic device 510. The live audio feed is a live audio feed or audio part of a live video feed.

The system architecture 702 for audio event detection includes a feature extractor 706, a feature classifier 708, an event detector 710, and a user interface enabler 712. Upon receiving the audio data associated with the live audio feed, the feature extractor 706, the feature classifier 708, and the event detector 710 are configured to implement on the audio data the above audio data operations 618-622 of feature extraction, feature classification and event detection sequentially. The user interface enabler 712 generates event alerts and facilitates review of any detected signature event on a display of the client device 504. Additionally, the user interface enabler 712 receives user edits on event detection criteria, and user preferences for alerts and event filters. The system architecture 702 for audio event detection further includes a memory that stores one or more of audio data 714, classifier models 716, event detection criteria 718, and event data 720.

In various implementations of the application, the feature classifier 708 relies on a classifier model provided by the server system 508 to implement the corresponding feature classification operation 620. As explained above, this classifier model is adaptively generated at the server system 508 at least according to the capabilities of the electronic device 510 and the ambient sound characteristics. In some implementations, the choice of the classifier model is also determined by several factors such as amount of data that is available to train the classifier model. Basically, these constraints determine complexity level of a feature space, and whether a time or frequency domain approach is applicable in association with the classifier model. The classifier model, once adaptively determined, further determines some parameters in the feature detector 706, e.g., the number and the order of the elements of a feature vector, what each element of the feature vector represents, and whether a time domain or frequency domain approach is applied in feature extraction and classification. Some examples of classifier models include a neural network, a random forest model, a linear support vector machine (SVM), a naïve Bayes classifier model, and a Gaussian Mixture Model.

In some implementations, a classifier model is fine tuned to obtain a desirable performance point on a Receiver operating characteristic (ROC) curve of the classifier model. For example, when the computational capability of the electronic device 510 is limited, a random forest model with 20 trees and 2000 leaf nodes is identified according to the ROC curve to show a desirable balance between feature classification performance and computational complexity. Typically, the feature classification performance is associated with an acceptable number of false positives that can be tolerated by the corresponding feature classification operation 620. The performance point on the ROC curve (e.g., a random forest model having 20 trees and 2000 leaf nodes) is determined under the condition that the feature classification performance satisfies the requirement of the acceptable number of false positives.

In some implementations as explained above with reference to FIG. 6, when the server system 508 determines the classifier model adaptively, it has taken into account local computational, caching and storage capabilities of the electronic device 510 in addition to the ambient sound characteristics of the electronic device 510. Thus, when the components 706-712 are located on the electronic device 510, they are configured to implement the audio data operations 618-622 of feature extraction, feature classification and event detection efficiently based on the classifier model.

Conversely, in some implementations not illustrated in FIG. 6, the server system 508 includes at least one of the feature extractor 706, the feature classifier 708, and the event detector 710. This arrangement takes advantage of capabilities of the server system 508 for implementing the respective operation 618-622. For example, the feature extraction operation 618 is optionally implemented at the server system 508 to generate the feature vector from the audio data associated with an input audio signal. The audio data is transferred from the electronic device 510 to the server system 508 for the feature exaction operation 618. After the feature extractor 706 located at the server system 508 generates the feature vector, the server system 508 returns the feature vector to the electronic device 510 for further feature classification and event detection. The above arrangement reserves some computational capabilities of the electronic device 510 by implementing one or more of the respective operations 618-622 remotely in the server system 508. In some implementations, this arrangement demands more communication bandwidth from the networks 162 that communicatively couples the electronic device 510 and the server system 508. Thus, one or more of the respective audio data operation 618-622 are implemented remotely in the server system 508, when the local computational capability of the electronic device 510 is limited in view of the complexity of the respective operation(s) 618-622 of feature extraction, feature classification or event detection, and when there is sufficient data communication bandwidth to communicate intermediate data results between the electronic device 510 and the server system 508.

One of ordinary skill in the art would recognize various ways to detect the signature audio event as described herein. Additionally, it should be noted that details of other details described herein with respect to the system architecture 702 for audio event detection (e.g., FIG. 7) are also applicable in an analogous manner the event detection process 600 and the event detection method 1700 described above with respect to FIGS. 6 and 17, respectively.

Figure 8:
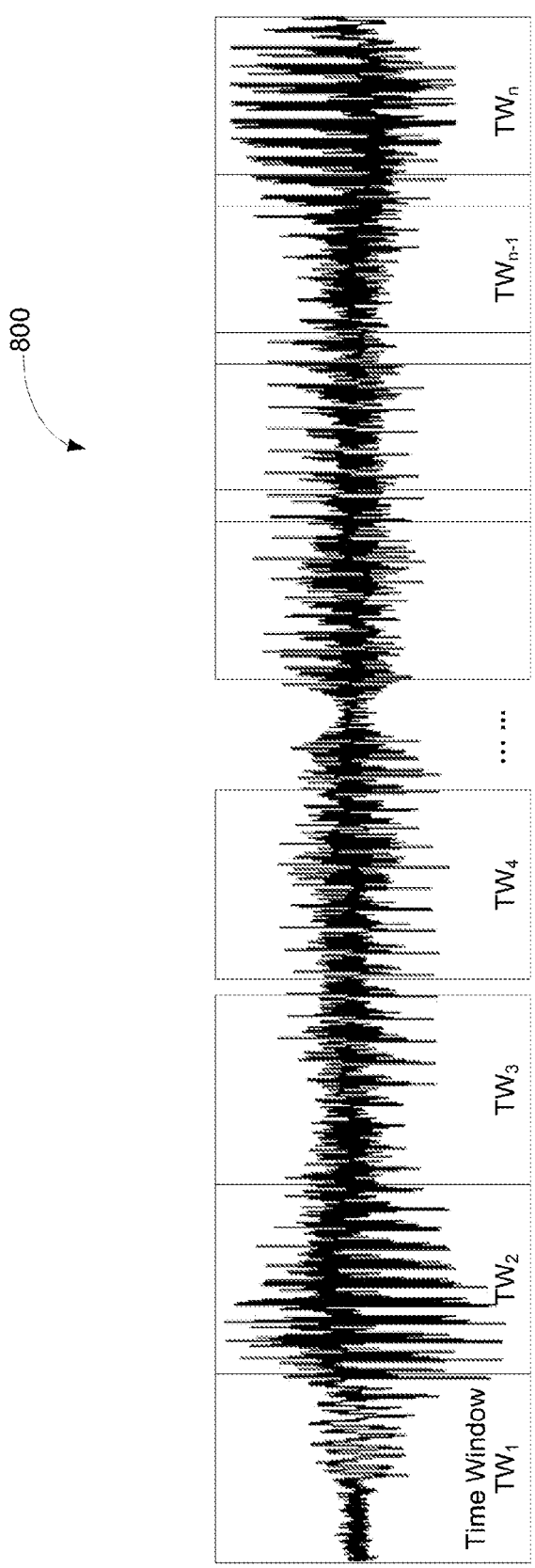
FIG. 8 illustrates time-domain audio data associated with an audio signal in accordance with some implementations.

FIG. 8 illustrates time-domain audio data associated with an audio signal in accordance with some implementations. In some implementations, the audio signal captured by the electronic device 510 is sampled at a sampling rate RS to generate a series of audio data. The audio data include one or more of an audio feature that needs to be identified from the audio data, a plurality of alternative features, and ambient noises. In a specific example, the audio data include a baby sound, dog barks, adult conversation, music and dish washer noise. Each of the audio features and the ambient noises normally has their respective temporal or spectrum characteristics. For example, a baby cry has several peaks located approximately at 800 Hz, 1400 Hz, 1800 Hz and 3600 Hz on a power spectrum density curve. In contrast, a typical adult male voice is associated with a fundamental frequency from 85-180 Hz in the adult conversation, and that of a typical adult female from 165-255 Hz.

As the audio data is generated from the audio signal in real-time (i.e., a live audio feed), it is partitioned to a series of time windows, including time windows $TW_1$, $TW_2$, $TW_3$, $TW_4$, . . . , $TW_{n-1}$, and $TW_a$. In some implementations, the series of time windows includes a set of consecutive windows (e.g., $TW_1$-$TW_3$) that are directly adjacent to each other without any overlapping. In some implementations, the series of time windows includes one or more time windows (e.g., $TW_n$) that overlap with either of its two neighboring time windows by a predetermined percentage rate (25%), but do not entirely encompass either neighboring time window. For example, 25% of the time window $TW_n$ overlaps with its neighboring time window $TW_{n-1}$. In some implementations, the series of time windows includes one or more time windows (e.g., $TW_4$) that are stand-alone time windows separated from either neighboring time windows. Optionally, all time windows of the series of time windows have a predetermined duration of time (e.g., 30 ms). Optionally, each of the series of time windows has a respective duration of time that is distinct from those of some other time windows.

Figure 9:
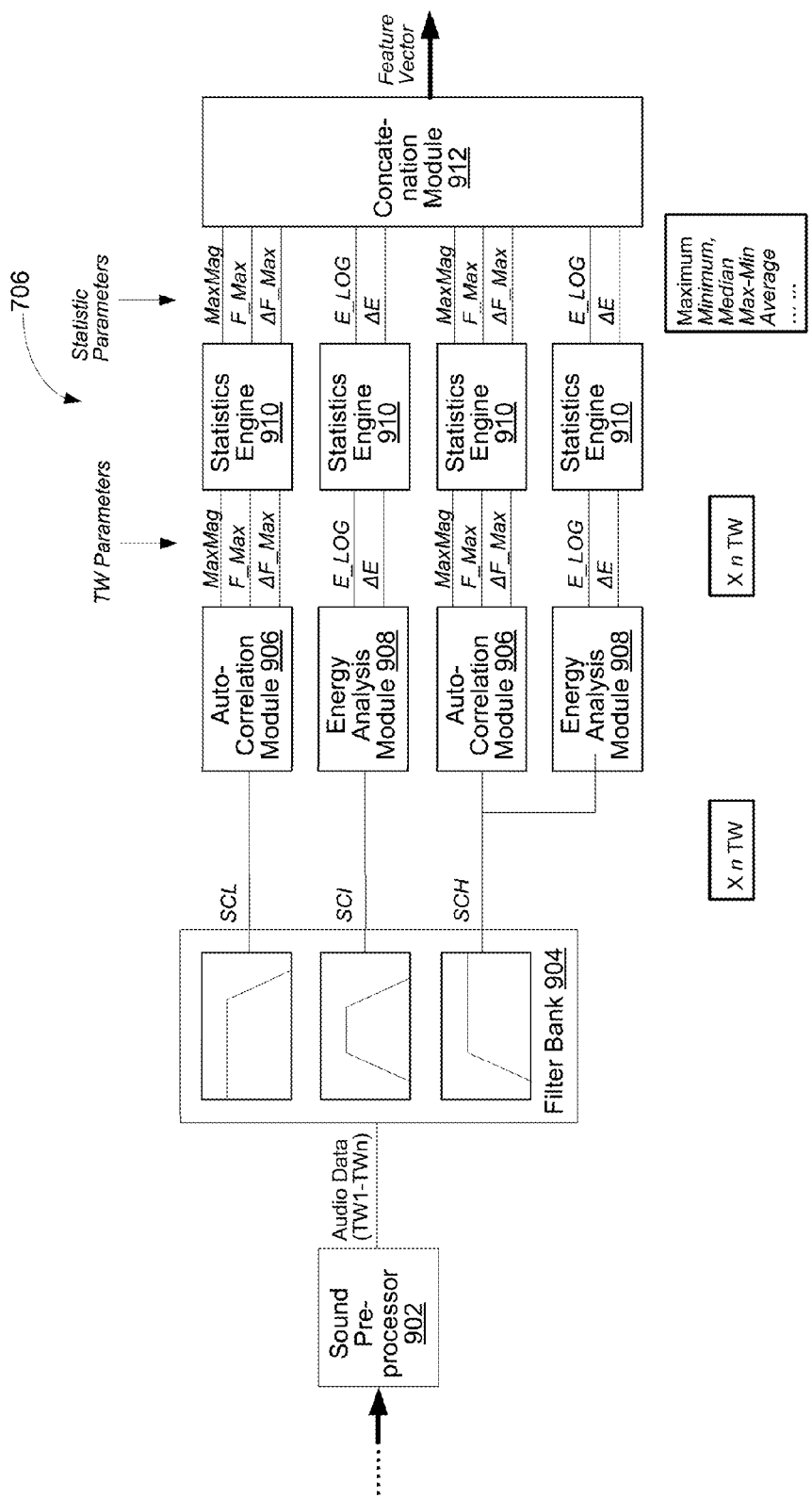
FIG. 9 is a block diagram of a feature extractor that extracts feature vectors from audio data as shown in FIG. 8 based on a time domain approach in accordance with some implementations.

As explained above with reference to FIGS. 6 and 7, in some implementations, a time domain approach or a frequency domain approach is applied to extract feature vectors from the audio data associated with an audio signal captured by the electronic device 510. FIG. 9 is a block diagram of a feature extractor 706 that extracts feature vectors from audio data as shown in FIG. 8 based on a time domain approach in accordance with some implementations, and FIG. 10 is a feature vector that has been extracted by the feature extractor 706 shown in FIG. 9 in accordance with some implementations.

In some implementations as shown in FIG. 9, the feature extractor 706 includes a sound preprocessor 902, a filter bank 904, one or more autocorrelation modules 906, one or more energy analysis modules 908, a plurality of statistics engines 910 and a concatenation module 912. The filter bank 904 includes a plurality of filters each associated with a respective frequency band. After the sound preprocessor 902 generates a series of audio data from an audio signal, the plurality of filters are applied to filter the audio data within each time window associated with the audio signal. Thus, the audio data is split to a plurality of sound components each associated with a respective frequency or frequency band and including a series of time windows. For example, the filter bank 902 includes three filters that are associated with three frequency bands: 900 Hz and below, 1000-5000 Hz, and 6000 Hz and above. The audio data is therefore split to three sound components: a low frequency sound component SCL, an intermediate frequency sound component SCI, and a high frequency sound component SCH. In this example, the sound component SCL includes the series of time windows $TW_1$-$TW_n$, but is only associated with low frequency (900 Hz and below) part of the audio data within these time windows. Likewise, the sound component SCI or SCH is only associated with intermediate frequency (1000-5000 Hz) part or high frequency (6000 Hz and above) part of the audio data within the series of time windows $TW_1$-$TW_n$.

In some implementations, the frequency bands associated with the plurality of sound components of the audio data are determined according to one or more of: the sound characteristics of the audio feature, the alternative features from which the audio feature needs to be distinguished, and the ambient noises. Specifically, in some implementations, both the number of the frequency bands and their characteristic frequencies are determined according to these sound characteristics. In the above example, the sound components SCL, SCI and SCH are determined according to the characteristic frequencies of the adult conversation, the baby sound/cry, and the music that often co-exist in the smart home environment.

After splitting the audio signal into frequencies and frequency bands, each sound component is analyzed in an autocorrelation module 906, an energy analysis module 908 or both modules. When a sound component (e.g., the low sound component SCL) is analyzed in the autocorrelation module 906, the autocorrelation module 906 identifies one or more harmonic peaks in a power spectrum density curve, and obtains the intensity (MaxMag) and/or the frequency (F_Max) of each of the one or more harmonic peaks. In some implementations, the autocorrelation module 906 compares the one or more harmonic peaks for each time window with that of its preceding time window within the sound component, and generates a variation of the respective frequency (ΔF_Max) of the corresponding one or more harmonic peaks.

When a sound component (e.g., the low sound component SCL) is analyzed in the energy analysis module 908, the energy analysis module 908 identifies an energy level (E) for each time window in the analyzed sound component. In some implementations, the energy levels associated with the time windows of the sound component are represented in a logarithm format (i.e., E_LOG). In some implementations, the energy analysis module 908 compares the respective energy level for each time window with that of its preceding time window within the sound component, and generates a variation of the respective energy level (ΔE).

In some implementations, the low frequency sound component SCL is analyzed by the autocorrelation module 906 to obtain a first set of time window (TW) parameters associated with harmonic characteristics of this sound component, including one or more of the intensity (MaxMag), the frequency (F_Max), the variation of the frequency (ΔF_Max) of the harmonic peaks associated with each time window of the sound component. The intermediate frequency sound component SCI is analyzed by the energy analysis module 908 to obtain a second set of TW parameters associated with energy of this sound component, including one or more of the logarithm energy level (E_LOG) and the variation of the energy level (ΔE) associated with each time window of the sound component. The high frequency sound component SCH is analyzed by both the autocorrelation module 906 and the energy analysis module 908 to obtain a third set of TW parameters associated with energy of this sound component, including one or more of the intensity (MaxMag) and the frequency (F_Max) of the harmonic peaks, and the variation of the frequency (ΔF_Max), the logarithm energy level (E_LOG), and the variation of the energy level (ΔE) associated with each time window of the sound component. As a result of autocorrelation and energy analysis, each time window is associated with a plurality of TW parameters representing the harmonic characteristics and energy levels of the audio signal within different frequency bands. In this example, each time window is associated with ten TW parameters grouped in three sets.

Each statistics engine 910 groups a first number of consecutive time windows, and statistically process the TW parameters associated with the consecutive time windows in the group to generate a set of statistic parameters for each group of time windows. In some implementations, an imaginary sliding window is created to group the first number of consecutive time windows, and every two adjacent sliding windows have an overlap of a second number of time windows. In a specific number, the first and second numbers are equal to 30 and 5, that is to say that the sliding window groups 30 consecutive time windows every two adjacent ones of which share 5 time windows.

For each sliding window group, the statistics engine 901 identifies one or more statistic parameters for each type of TW parameter associated with the time windows within the sliding window. The one or more statistic parameters include but are not limited to a maximum value, a minimum value, a median value, an average value, and a difference between the maximum and minimum values. Then, for this sliding window group, the one or more statistic parameters of all statistic parameters associated with the time windows are then combined into a feature vector according to a specific order determined according to a classifier model associated with subsequent feature classification.

Specifically, in the above example, each sliding window groups includes 30 time windows, and therefore, is associated with 30 parameter values for each TW parameter associated with the 30 time windows. For each TW parameter associated with these 30 time windows, e.g., the logarithm energy level E_LOG at the high frequency band, the statistics engines 910 then identify a maximum value, a minimum value, a median value, and a difference between the maximum and minimum values from the corresponding 30 parameter values. When each time window is associated with 10 TW parameters, the statistics engines 910 identifies total 40 parameter values, and these 40 parameter values are combined in a first feature vector FV1 associated with the sliding window group (shown in FIG. 10).

As the audio data are fed into the feature extractor 702 in real-time, the sliding window proceeds to cover a subsequent series of time windows that optionally overlap with the preceding series of time windows by the second number of time windows. A second feature vector FV2 is statistically generated, and includes a plurality of elements that represent the parameter values associated with the harmonic characteristics and energy level of this subsequent sliding window group.

After obtaining a plurality of feature vectors (e.g., FV1 and FV2) for consecutive sliding window groups, the concatenation module 912 combines the feature vectors to generate a comprehensive feature vector for subsequent feature classification by the classifier model provided by the server system 508. In some implementations, the concatenation module 912 combines (e.g., concatenates) five feature vectors generated from five consecutive sliding window groups to obtain the comprehensive feature vector. In the above example, when the feature vector associated with each sliding window group includes 40 elements, the comprehensive vector includes 200 elements.

Each element of the comprehensive feature vector is associated with a statistic parameter value for a TW parameter associated with the harmonic characteristics or the energy level that time windows of a sliding window group have within a certain frequency band. In accordance with FIG. 11, the annotation of each element of the comprehensive feature vector represents the origin of the respective element. For example, "E_log_f3_med" in the second feature vector FV2 refers to a medium value of the logarithm energy level values that the time windows of the second sliding window group have within the high frequency band.

Figure 11:
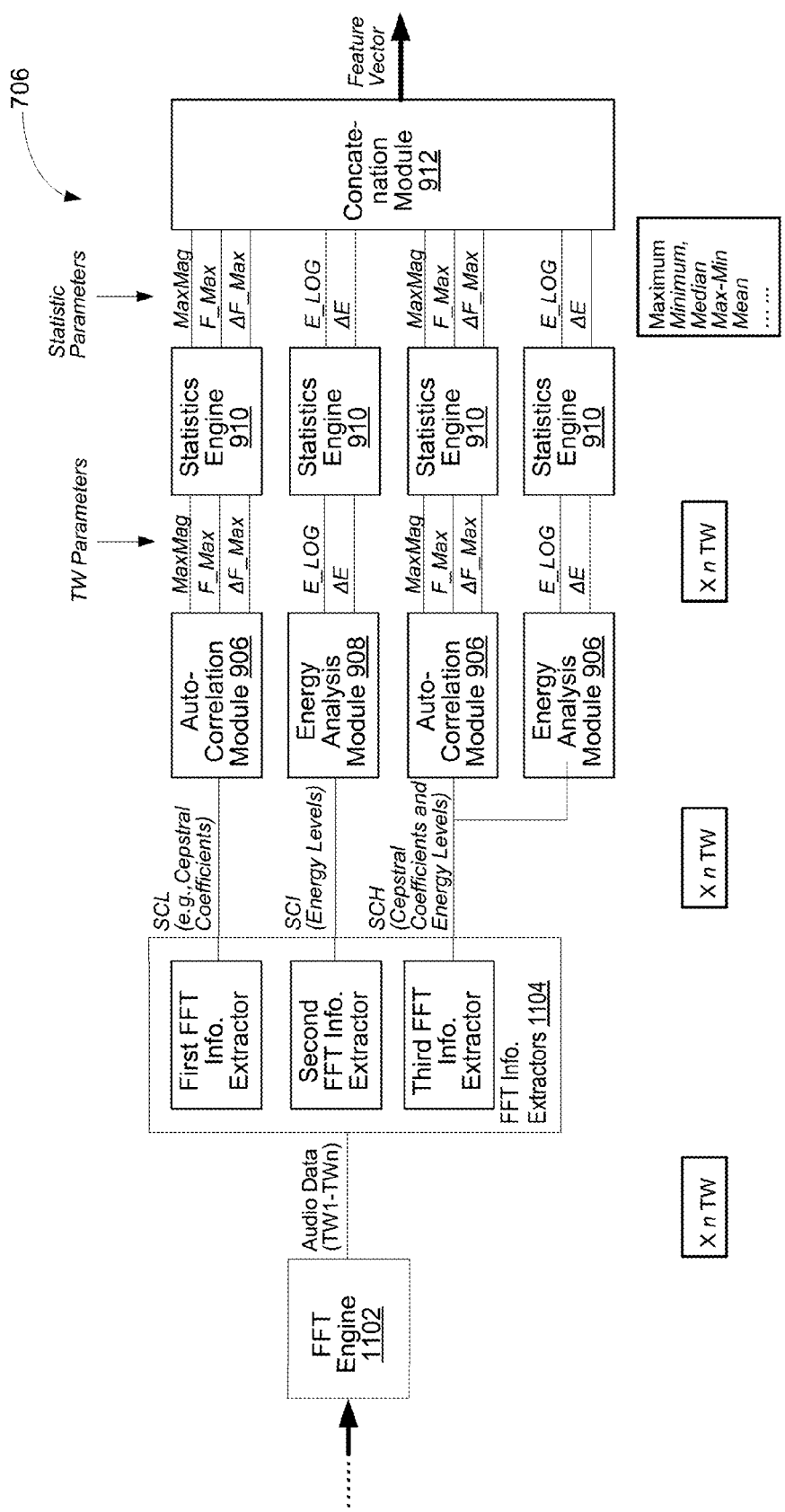
FIG. 11 is a block diagram of a feature extractor that extracts feature vectors from audio data as shown in FIG. 8 based on a frequency domain approach in accordance with some implementations.

FIG. 11 is a block diagram of a feature extractor 706 that extracts feature vectors from audio data as shown in FIG. 8 based on a frequency domain approach in accordance with some implementations. In such a frequency domain approach, the feature extractor 706 includes some or all modules of a Fast Fourier Transform (FFT) engine 1102, a plurality of FFT Information Extractors 1104, one or more autocorrelation modules 906, one or more energy analysis module 908, a plurality of statistics engines 910 and a concatenation module 912. At the FFT engine 1102, the audio signal is sampled at a sampling rate RS, partitioned to a plurality of time windows (TW$_1$-TW$_n$), and converted into audio data using the Fast Fourier Transform (FFT). In some implementations, the resulting audio data includes a plurality of FFT coefficients (e.g., Cepstral coefficients associated with different harmonic frequencies).

Each of the plurality of FFT information extractors 1104 is associated with a respective frequency or frequency band. After the FFT engine 1102 generates a series of audio data from the audio signal, each of the plurality of FFT information extractors 1104 is applied to filter the audio data of each time window in association with a corresponding frequency or frequency band. Thus, the audio data is split to a plurality of sound components each associated with a respective frequency or frequency band and including a series of time windows. For example, similarly to the time domain approach, the feature extractor 706 here can include three FFT information extractors 1104 that are associated with three frequency bands: 900 Hz and below, 1000-5000 Hz, and 6000 Hz and above. Likewise, the audio data is split to three sound components: a low frequency sound component SCL (900 Hz and below), an intermediate frequency sound component SCI (1000-5000 Hz), and a high frequency sound component SCH (6000 Hz and above). Each sound component SCL, SCI or SCH includes the series of time windows TW$_1$-TW$_n$ but is only associated with part of the acoustic sound within these time windows. Unlike the time domain approach, the sound components of the audio data are represented in the frequency domain, for example as FFT coefficients, in this frequency domain.

After splitting the audio signal, each sound component is analyzed in an autocorrelation module 906, an energy analysis module 908 or both modules. When a sound component (e.g., the low sound component SCL) is analyzed in the autocorrelation module 906, the autocorrelation module 906 identifies one or more harmonic peaks in a power spectrum density curve, and obtains the intensity (MaxMag) and/or the frequency (F_Max) of each of the one or more harmonic peaks. In some implementations, the autocorrelation module 906 compares the one or more harmonic peaks for each time window with that of its preceding time window within the sound component, and generates a variation of the respective frequency ($\Delta$F_Max) of the corresponding one or more harmonic peaks. Here, in some implementations, the autocorrelation module 908 receives Cepstral coefficients from the sound component that are generated from the FFT, and obtains the intensity (MaxMag), the frequency (F_Max), and/or the variation of the frequency ($\Delta$F_Max) associated with the harmonic peaks within each time window. Specifically, the position and magnitude of the Cepstral peaks generated from the FFT are used to represent the frequency (F_Max) and the intensity (MaxMag), respectively.

When a sound component (e.g., the low sound component SCL) is analyzed in the energy analysis module 908, the energy analysis module 908 identifies an energy level (E) for each time window in the analyzed sound component. In some implementations, the energy levels associated with the time windows of the sound component are represented in a logarithm format (i.e., E_LOG). In some implementations, the energy analysis module 908 compares the respective energy level for each time window with that of its preceding time window within the sound component, and generates a variation of the respective energy level ($\Delta$E). Here, in some implementations, the energy analysis module 908 receives the energy levels (E) from the sound component that is generated from the FFT, and obtains the logarithm sound level (E_LOG) and the variation of the energy level ($\Delta$E) for each time window.

In some implementations, the low frequency sound component SCL is analyzed by the autocorrelation module 906 to obtain a first set of TW parameters associated with harmonic characteristics of this sound component. Example TW parameters associated with harmonic characteristics of this sound component include, but are not limited to the intensity (MaxMag), the frequency (F_Max), the variation of the frequency ($\Delta$F_Max) of the harmonic peaks associated with each time window of the sound component. In an example, the first set of TW parameters associated with harmonic characteristics includes one or more Cepstral coefficients extracted by the FFT information extractors 1104. In an example, the first set of TW parameters include 10 Cepstral coefficients associated with the lowest ten frequency components generated by the FFT engine 1102 within the low frequency band associated with the sound component SCL.

The intermediate frequency sound component SCI is analyzed by the energy analysis module 908 to obtain a second set of TW parameters associated with energy of this sound component, including one or more of the logarithm energy level (E_LOG) and the variation of the energy level ($\Delta$E) associated with each time window of the sound component. The high frequency sound component SCH is analyzed by both the autocorrelation module 906 and the energy analysis module 908 to obtain a third set of TW parameters associated with energy of this sound component. As a result of autocorrelation and energy analysis, each time window is associated with a plurality of TW parameters representing the harmonic characteristics and energy levels of the audio signal within different frequency bands. In this example, each time window is associated with ten TW parameters grouped in three sets, and each parameter is obtained based on the Cepstral coefficients or other information related to Cepstral peaks generated from the FFT in the FFT engine 1102.

Each statistics engine 910 groups a first number of consecutive time windows, and statistically process the TW parameters associated with the consecutive time windows in the group to generate a set of statistic parameters for each group of time windows. After obtaining a plurality of feature vectors (e.g., FV1 and FV2) for consecutive sliding window groups, the concatenation module 912 combines the feature vectors to generate a comprehensive feature vector for subsequent feature classification by the classifier model provided by the server system 508. More details on the statistics engines 910 and the concatenation module 912 are explained above with reference to FIG. 9. The comprehensive feature vector generated based on the frequency domain approach is similar to the comprehensive feature vector shown in FIG. 10, except that it may include some Cepstral coefficients or other information related to Cepstral peaks generated from the FFT of the audio signal.

After the comprehensive feature vector is generated by the feature extractor 706 (optionally based on a time domain or frequency domain approach), the feature classifier 708 classifies whether the audio signal associated with the comprehensive feature vector corresponds to an audio feature (e.g., a baby sound). In some implementations, the feature classifier 708 generates a probability value estimate to represent the likelihood that the feature vector corresponds to the audio feature (e.g., the baby sound). Typically, the probability value has a value in a range between 0 and 1.

Figure 12:
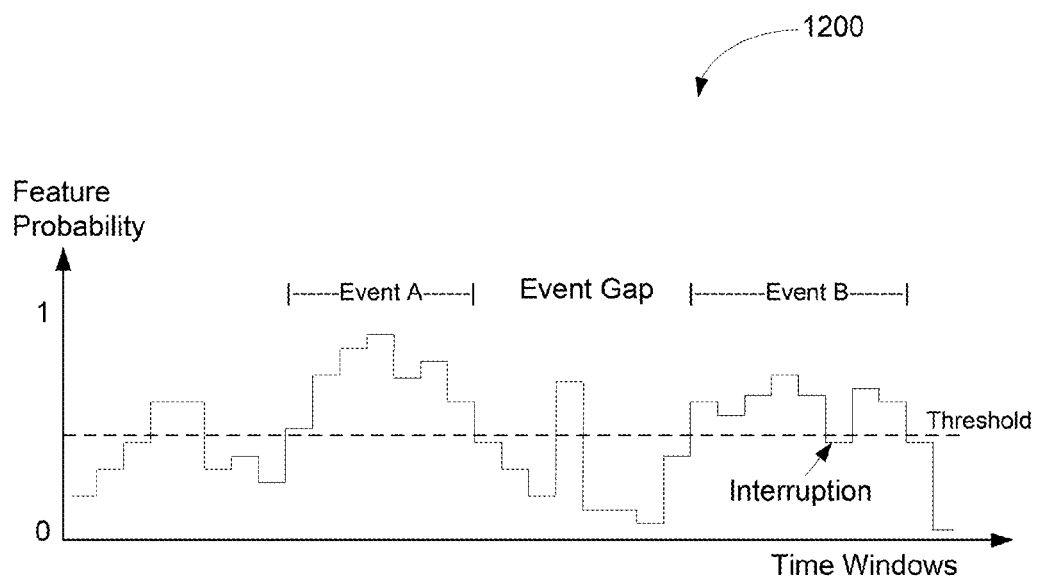
FIG. 12 is a time diagram of a probability value indicating likelihood that a feature vector corresponds to an audio feature in accordance with some implementations.

FIG. 12 is a time diagram 1200 of a probability value indicating likelihood that a feature vector corresponds to an audio feature in accordance with some implementations. As explained above, each probability value step in FIG. 12 is computed by a classifier model from a feature vector that is associated with a sliding window group including a series of time windows. The probability value calculated from the feature vector is used to represent the probability of detecting the audio feature within a duration of time covered by the corresponding sliding window group. In some implementations, the probability value fluctuates between 0 and 1. When the probability value exceeds a predetermined probability threshold (e.g., 0.6) during a first sliding window group, the sliding window group is associated with the feature sound associated with the classifier model.

A signature event is detected when the feature sound lasts for an extended period of time according to predetermined event detection criteria. For example, a baby cry event is detected when a baby sound lasts for 5 seconds. Thus, the probability value has to meet predetermined event detection criteria for the purposes of determining whether this feature sound is associated with the corresponding signature event. In accordance an example event detection criterion, the audio feature has to be detected at least within a first number of consecutive sliding window groups for determining that the corresponding signature event has occurred (e.g., Event A). In accordance with another event detection criterion, the audio feature needs be detected within the first number of consecutive sliding window groups, but with a second number of interruption groups in compliance with an interruption limit. For example, Event B has only one interruption sliding window group within seven qualified sliding window groups. When the interruption lasts longer than the predetermined interruption limit, a feature sound that is detected subsequently to this interruption is automatically associated with a start of a new signature event.

Figure 13:
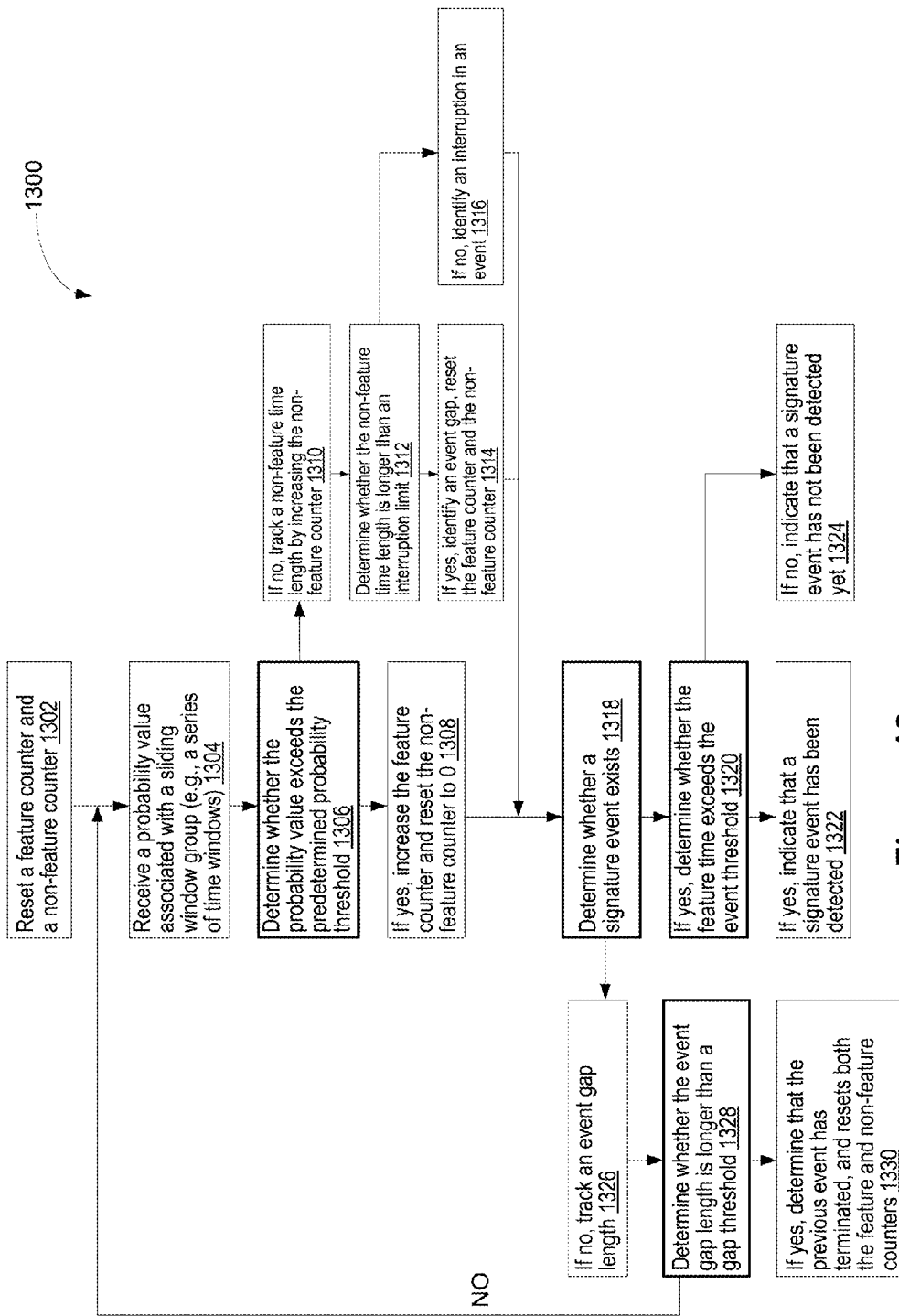
FIG. 13 is a flow chart for an event detection operation that is implemented by an event detector 710 in accordance with some implementations of the application.

FIG. 13 is a flow chart for an event detection operation 622 that is implemented by an event detector 710 in accordance with some implementations of the application. The event detector 710 includes a feature counter that tracks a feature time length in which a audio feature is detected, and a non-feature counter that tracks a non-feature time length of an interruption or a event gap in which the audio feature is not detected. As explained above, in some implementations, a signature event is detected, when the feature time length exceeds an event threshold, and when any interruption within the signature event is shorter than an interruption limit. Conversely, in some implementations, an interruption longer than the interruption limit is interpreted as an event gap between two events, and in some other implementations, an interruption is identified as an event gap between two signature events only when the interruption lasts longer than another gap threshold.

The event detector 710 resets (1302) the feature counter and the non-feature counter. Then, the event detector receives (1304) a probability value associated with a sliding window group that includes a series of time windows, and determines (1306) whether the received probability value exceeds the predetermined probability threshold. In accordance with a determination that the probability value exceeds the probability threshold, the feature counter is (1308) increased, and the non-feature counter is reset to zero. Stated another way, when the probability value exceeds the probability threshold, the event detector 710 identifies the audio feature rather than an interruption in association with a signature event.

On the other hand, after determining that the probability value does not exceed the probability threshold, the event detector 710 determines that an interruption or an event gap occurs. Specifically, the event detector 710 tracks (1310) a non-feature time length by increasing the non-feature counter, and then determines (1312) whether the non-feature time length is longer than the interruption limit. In some implementations, when it is determined that the non-feature time length is longer than the interruption limit, the event detector 710 identifies (1314) an event gap, and thereby resets both the feature counter and the non-feature counter. Alternatively, when it is determined that the non-feature time length is shorter than the interruption limit, the event detector 710 identifies (1316) an interruption in the signature event.

The event detector 720 then determines (1318) whether a signature event already exists during a previous sliding window group. The signature event already exists in the previous sliding window group, when the window group is optionally associated with the audio feature or the interruption that is shorter than the interruption limit. In accordance with a determination that the signature event already exists, it is further determined (1320) whether the feature time exceeds the event threshold. When the feature time exceeds the event threshold, the event detector 710 indicates (1322) that the signature event has been detected or continued from the previous sliding window group. Otherwise, the event detector 710 indicates (1324) that the signature event has not been detected yet. On the other hand, when the event detector 710 determines that the signature event does not already exist, it tracks (1326) an event gap length derived from the non-feature time length and the interruption, and determines (1328) whether the event gap length is longer than a predetermined gap threshold. When the event gap length is longer than the gap threshold, the event detector 710 determines (1330) that the previous event has terminated, and resets both the feature and non-feature counters.

Thus, in accordance with the corresponding event detection criteria, the event detector 710 is associated with one or more of an event threshold, an interruption limit, and a event gap threshold that are used to define a signature event, an interruption within the signature event, and an event gap between two signature events, respectively. In an example, the event threshold, the interruption limit and the event gap threshold are set forth as 15 sliding window groups, 10 seconds and 30 seconds. When each sliding window includes 150 time windows each lasting for 30 msec, the signature event is detected when 15 or more consecutive sliding window groups are associated with the feature events or the allowed interruptions. The detected signature event lasts for 67.5 or more seconds with interruptions less than 10 seconds. In some situations, the interruptions longer than the interruption limit is automatically associated with event gaps, and however, in this example, the event gaps between two signature events are required to last longer than 30 seconds according to the event detection criteria.

Figure 14:
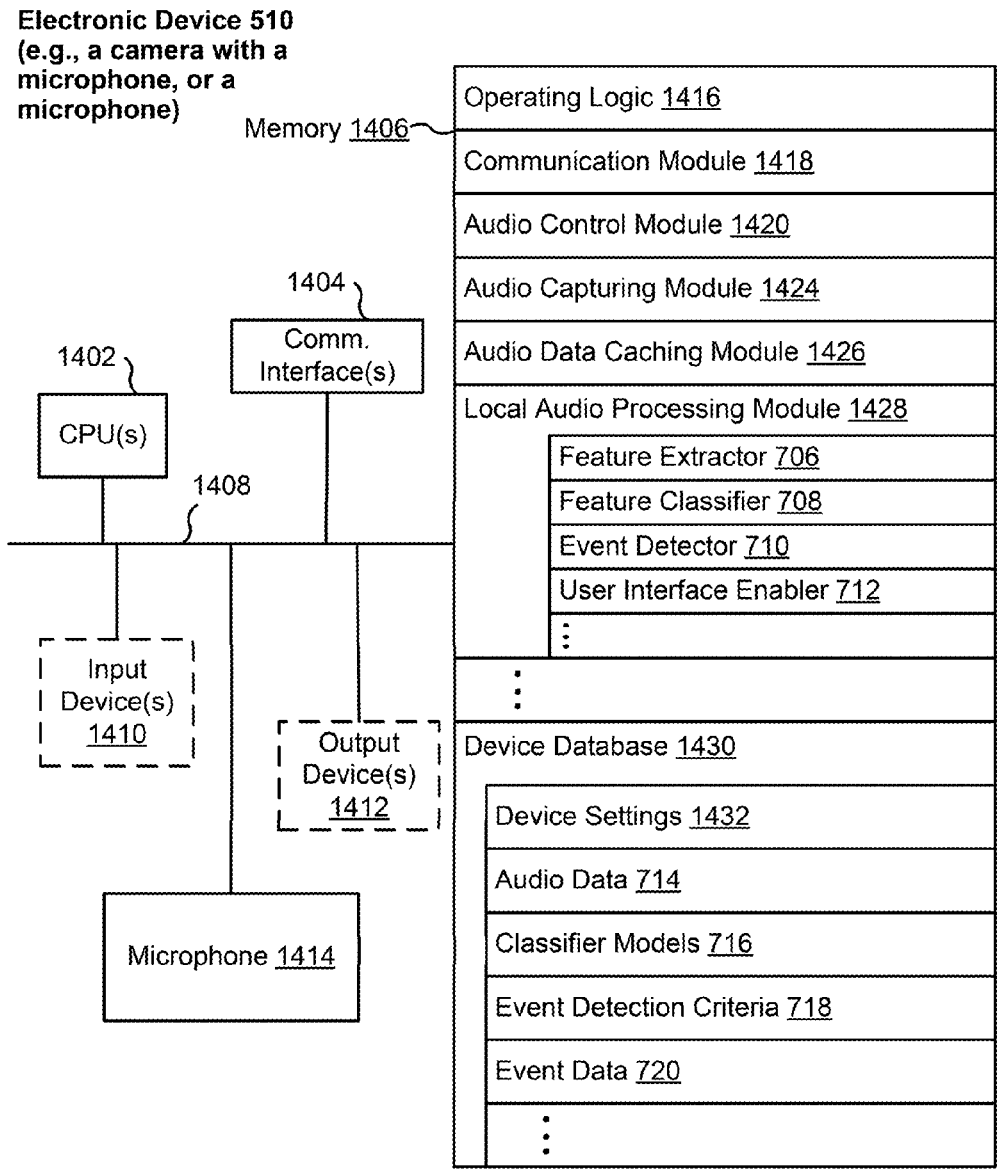
FIG. 14 is a block diagram illustrating a representative electronic device (e.g., a camera 118 and a microphone 124) in accordance with some implementations.

FIG. 14 is a block diagram illustrating a representative electronic device 510 (e.g., a camera 118 and a microphone 124) in accordance with some implementations. In some implementations, the electronic device 510 includes one or more processing units (e.g., CPUs, ASICs, FPGAs, microprocessors, and the like) 1402, one or more communication interfaces 1404, memory 1406, and one or more communication buses 1408 for interconnecting these components (sometimes called a chipset). In some implementations, the electronic device 510 includes one or more input devices 1410 such as one or more buttons for receiving input. In some implementations, the electronic device 510 includes one or more output devices 1412 such as one or more indicator lights, a sound card, a speaker, a small display for displaying textual information and error codes, etc. Furthermore, some the electronic device 510 uses a microphone and voice recognition or a camera and gesture recognition to supplement or replace the keyboard.

Memory 1406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1406, or alternatively the non-volatile memory within memory 1406, includes a non-transitory computer readable storage medium. In some implementations, memory 1406, or the non-transitory computer readable storage medium of memory 1406, stores the following programs, modules, and data structures, or a subset or superset thereof:

Operating system 1416 including procedures for handling various basic system services and for performing hardware dependent tasks;

Network communication module 1418 for connecting the electronic device 510 to other client devices (e.g., the client device 504, the server system 508, the client device, network routing devices, one or more controller devices, and networked storage devices) connected to one or more networks 162 via one or more communication interfaces 1404 (wired or wireless);

Audio control module 1420 for modifying the microphone device's operation mode;

Audio data capturing module 1428 for capturing and generating multimedia data streams and sending the multimedia data stream to the client device 504 or the server system 508 as a continuous feed or in short bursts;

Audio data caching module 1430 for storing some or all captured video data locally at one or more local storage devices (e.g., memory, flash drives, internal hard disks, portable disks, etc.)

Local audio data processing module 1428 for performing preliminary processing of the captured audio data locally at the microphone device 504, where the local audio data processing module 1428 further includes one or more of: a feature extractor 706, a feature classifier 708, an event detector 710 and a user interface enabler 712; and Device database 1430 storing data, including but not limited to:

Device settings 1432 that include one or more of storage, computational, and communication capabilities of the electronic device 510, and ambient sound characteristics of the electronic device 510;

Raw audio data recorded by the electronic device 510 (e.g., raw camera video or raw microphone audio) or processed audio data 714 that have been preliminarily processed by local data processing module 1428;

one or more classifier models 716;

event detection criteria 718; and event data 7120.

More details on the modules 706-712 and data 714-720 are explained above with reference to FIG. 7. As explained above, one or more modules of the feature extractor 706, the feature classifier 708, the event detector 710 and the user interface enabler 712 are optionally implemented on the server system 508.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 1406, optionally, stores a subset of the modules and data structures identified above. Furthermore, memory 1406, optionally, stores additional modules and data structures not described above.

Figure 15:
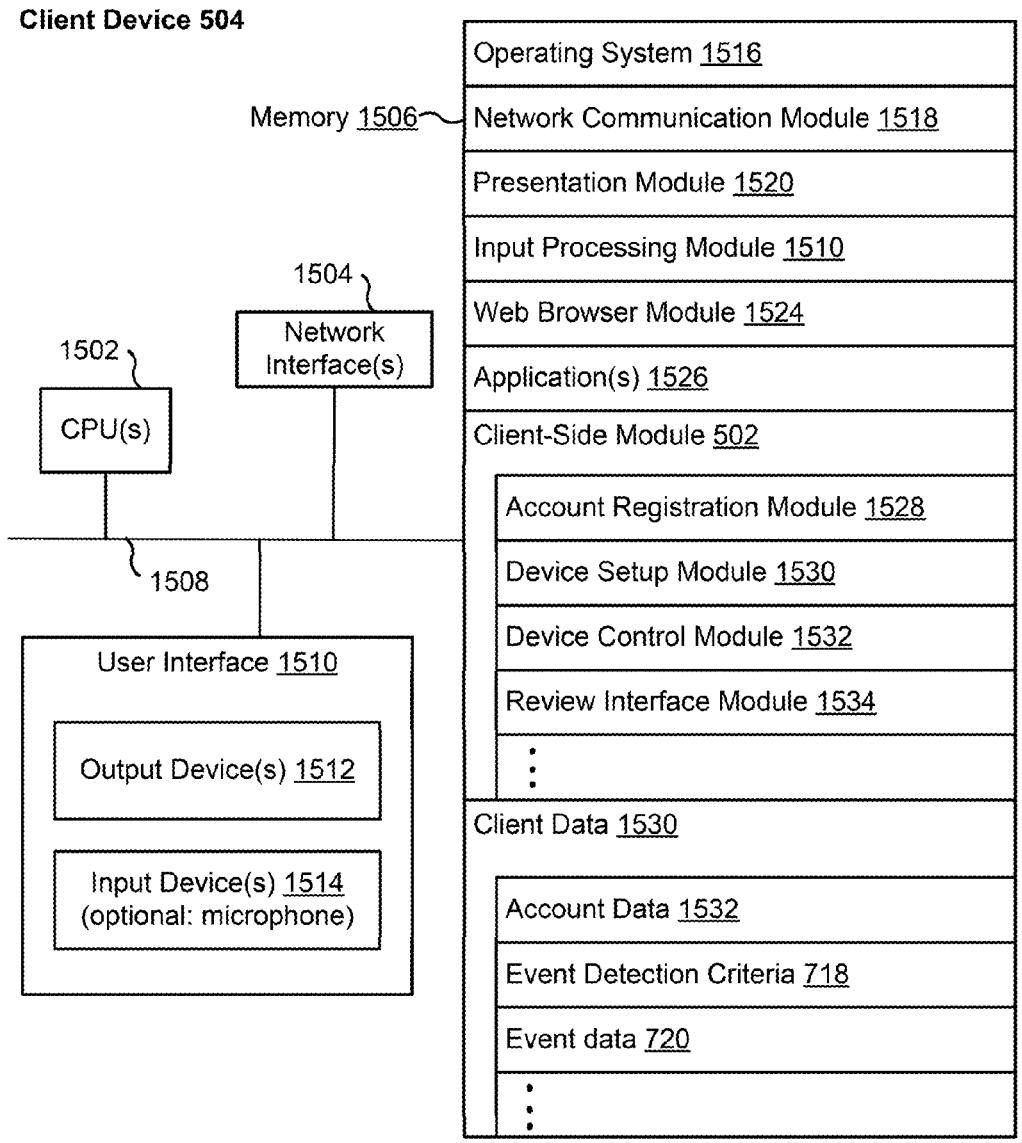
FIG. 15 is a block diagram illustrating a representative client device associated with a reviewer account in accordance with some implementations.

FIG. 15 is a block diagram illustrating a representative client device 504 associated with a reviewer account in accordance with some implementations. The client device 504, typically, includes one or more processing units (CPUs) 1502, one or more network interfaces 1504, memory 1506, and one or more communication buses 1508 for interconnecting these components (sometimes called a chipset). The client device also includes a user interface 1510. User interface 1510 includes one or more output devices 1512 that enable presentation of media content, including one or more speakers and/or one or more visual displays. User interface 1510 also includes one or more input devices 1514, including user interface components that facilitate user input such as a keyboard, a mouse, a voice-command input unit or microphone, a touch screen display, a touch-sensitive input pad, a gesture capturing camera, or other input buttons or controls. Furthermore, some the client devices use a microphone and voice recognition or a camera and gesture recognition to supplement or replace the keyboard. In some implementations, the client device includes one or more cameras, scanners, or photo sensor units for capturing images, for example, of graphic series codes printed on the electronic devices. Optionally, the client device includes a location detection device 1515, such as a GPS (global positioning satellite) or other geo-location receiver, for determining the location of the client device.

Memory 1506 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1506, optionally, includes one or more storage devices remotely located from one or more processing units 1502. Memory 1506, or alternatively the non-volatile memory within memory 1506, includes a non-transitory computer readable storage medium. In some implementations, memory 1506, or the non-transitory computer readable storage medium of memory 1506, stores the following programs, modules, and data structures, or a subset or superset thereof:

Operating system 1516 including procedures for handling various basic system services and for performing hardware dependent tasks;

Network communication module 1518 for connecting the client device to other client devices (e.g., server system 1506 and the electronic devices) connected to one or more networks 162 via one or more network interfaces 1504 (wired or wireless);

Presentation module 1520 for enabling presentation of information (e.g., a graphical user interface for presenting application(s) 1526 or the client-side module 72, widgets, websites and web pages thereof, and/or games, audio and/or video content, text, etc.) at the client device via one or more output devices 1512 (e.g., displays, speakers, etc.) associated with user interface 1510;

Input processing module 1522 for detecting one or more user inputs or interactions from one of the one or more input devices 1514 and interpreting the detected input or interaction;

Web browser module 1524 for navigating, requesting (e.g., via HTTP), and displaying websites and web pages thereof, including a web interface for logging into a reviewer account, controlling the electronic devices associated with the reviewer account, and editing and reviewing data that are captured by the electronic devices and optionally processed by server system 1506;

One or more applications 1526 for execution by the client device (e.g., games, social network applications, smart home applications, and/or other web or non-web based applications for controlling electronic devices and reviewing data captured by the electronic devices);

Client-side module 502, which provides client-side functionalities for device provisioning, device control, data processing and data review, including but not limited to:

Account registration module 1528 for establishing a reviewer account for monitoring audio data captured by electronic devices 510;

Device setup module 1530 that provisions electronic devices 510 (sometimes in cooperation with the account registration module 1528), associates one or more electronic devices 510 with a corresponding reviewer account, and identifies the capabilities and the ambient sound characteristics of the electronic devices 510 associated with the reviewer account;

Device control module 1532 for generating control commands for modifying an operating mode of the one or more the electronic devices 510 in accordance with user input; and Review interface module 1534 for providing user interfaces for reviewing the data that are processed by server system 508 and displayed on the display of the client device 504; and client data 1530 storing data associated with the reviewer account and electronic devices, including, but is not limited to:

Account data 1532 storing information related with both reviewer accounts loaded on the client device 504 and electronic devices 510 associated with the reviewer accounts, wherein such information includes cached login credentials, electronic device identifiers (e.g., MAC addresses and UUIDs), user interface settings, display preferences, authentication tokens and tags, password keys, etc.; and Local data storage database 1564 for selectively storing raw or processed data associated with electronic devices 510 (e.g., a camera) that has been linked to the reviewer accounts, event detection criteria 718 and event data 720.

In some implementations, the account data 1532 include the identified capabilities and the ambient sound characteristics of the electronic devices 510 associated with the reviewer account. The client device 504 provides such data to the server system 508 such that the server system 508 can adaptively provide a classifier model to the electronic devices 510 based on the capabilities and the ambient sound characteristics of the electronic devices 510.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 1506, optionally, stores a subset of the modules and data structures identified above. Furthermore, memory 1506, optionally, stores additional modules and data structures not described above.

Figure 16:
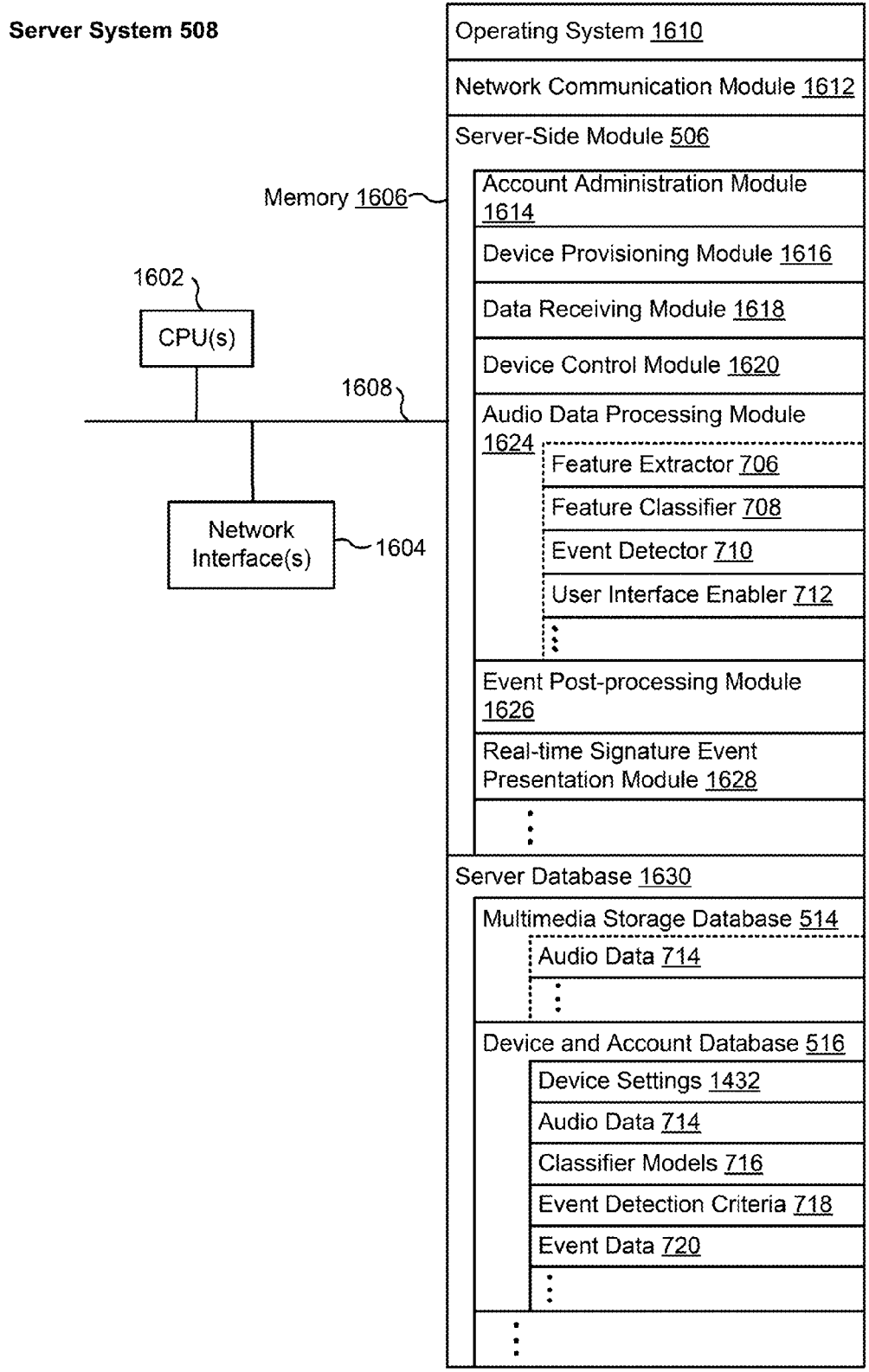
FIG. 16 is a block diagram illustrating a server system in accordance with some implementations.

FIG. 16 is a block diagram illustrating the server system 508 in accordance with some implementations. The server system 508, typically, includes one or more processing units (CPUs) 78, one or more network interfaces 1604 (e.g., including I/O interface to one or more clients 106 and I/O interface to one or more the electronic devices), memory 76, and one or more communication buses 1608 for interconnecting these components (sometimes called a chipset). Memory 1606 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 1606, optionally, includes one or more storage devices remotely located from one or more processing units 78. Memory 1606, or alternatively the non-volatile memory within memory 1606, includes a non-transitory computer readable storage medium. In some implementations, memory 1606, or the non-transitory computer readable storage medium of memory 1606, stores the following programs, modules, and data structures, or a subset or superset thereof:

Operating system 1610 including procedures for handling various basic system services and for performing hardware dependent tasks;

Network communication module 1612 for connecting the server system 508 to other client devices (e.g., the client devices and the electronic devices (including e.g., cameras) connected to one or more networks 162 via one or more network interfaces 1604 (wired or wireless);

Server-side module 506, which provides server-side functionalities for account management, device provision, device control, data processing and data review, including but not limited to:

Account administration module 1614 for creating reviewer accounts, and providing account login-services to client devices;

Device provisioning module 1616 that includes at least an account device link module for performing electronic device registration processing (sometimes in cooperation with the account administration module 1614) to establish and approve associations between the electronic devices 510 to their respective reviewer accounts;

Data receiving module 1618 for receiving raw or processed multimedia data (e.g., video and audio data) from electronic devices, and preparing the received data for further processing and long-term storage in the data storage database 1630;

Device control module 1620 for generating and sending server-initiated control commands to modify operation modes of the electronic devices 510, and/or receiving and forwarding user-initiated control commands to modify operation modes of the electronic devices; and Event post-processing module 1626 for further processing signature events that have been detected by the event detector 710 in the electronic device 510 or the server system 508;

Real-time signature event presentation module 1628 that configures detected signature events for presentation at the client device 504 according to user interface settings associated with the corresponding reviewer account;

Server data 1630 storing data for use in account management, device provision and control, data processing and data review, including but not limited to:

Multimedia storage database 514 that optionally stores raw or processed audio data 714 received from the electronic devices 510, as well as various types of metadata, such as available classifier models, training data, motion or audio events, event categories, event category models, event filters, and event masks, for use in data processing for event monitoring and review for each reviewer account; and Device and account database 516 for storing account information for reviewer accounts, including one or more of reviewer account information, information for device settings 1432 (e.g., service tier, device model, storage capacity, processing capabilities, communication capabilities, ambient sound characteristics etc.), audio data 714, one or more classifier models 716, event detection criteria 718, event data 720 associated with the electronic devices 510 linked to the respective reviewer account.

In some implementations, the server-side module 506 further includes audio processing module 1626 for processing the raw or processed data provided by the electronic devices 510 such that the processed data can be forwarded to a client device and reviewed by a user who logs onto a corresponding reviewer account on the specific client device. The audio processing module 1626 optionally includes one or more modules of the feature extractor 706, the feature classifier 708, the event detector 710 and the user interface enabler 712, when the electronic device 510 does not have the capabilities to implement the functions of the one or more modules 706-712.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 16066, optionally, stores a subset of the modules and data structures identified above. Furthermore, memory 1606, optionally, stores additional modules and data structures not described above.

In some implementations, any sort of access to any reviewer account must be expressly permitted by the user associated with the respective reviewer account or the client device 504 linked to the reviewer account. Further, the systems and methods may be implemented to anonymize the data associated with the correlation between the reviewer account and the data collected or generated by the electronic device 510 (e.g., the multimedia data or the event data). Thus, a monitoring service that receives information associated with the correlation may have no knowledge of any personal identifiable information (PII) associated with the user of the reviewer account or the user of the electronic device. Stated another way, the raw or processed data received from the reviewer account is processed to remove any PII associated with the user, such that the monitoring service may not recognize any PII when it receives such data from the reviewer account.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to communication data from or to a server that may be more relevant to the user. In addition, certain data may be treated in one or more ways before it is stored or used, so that PII is removed. For example, a user's identity may be treated so that no PII can be determined for the user, or a user's geographic location may be generalized where location information is obtained (such as to a city, ZIP code, or state level), so that a particular location of a user cannot be determined. In some implementations, a user's voice or conversation may be engineered (e.g., by varying the pitch of the voice or removing sensitive words) to hide the PII, In some implementations, the user may have control over how information is collected about the user and used by a server (e.g., a server system 508 or another server distinct from the server 508). The client device 504 is configured to provide a user interface that allows a user associated with a reviewer account to control how information is collected and used. Optionally, the user may choose to encrypt the multimedia data or the event data provided by the electronic device 510 when such multimedia or event data are communicated to either of the server 508 and the client device 504. Encryption not only improves the data security, but also hides the PII in the data.

FIGS. 17A-17D are flow diagrams illustrating a method 1700 of detecting a signature event associated with an audio feature in accordance with some implementations. In an example, the audio feature is (1752) associated with a baby sound, and the signature event is associated with an extended baby cry event. The method 1700 is, optionally, governed by instructions that are stored in a non-transitory computer readable storage medium and that are executed by one or more processors of an electronic device 510. In some implementations, operations of the event detection method 1700 is governed by instructions that are stored in a non-transitory computer readable storage medium and that are executed by one or more processors of a client device 504 and/or a server system 508. Each of the operations shown in FIGS. 17A-17D may correspond to instructions stored in a computer memory or non-transitory computer readable storage medium (e.g., memory 1406, 1506 or 1606). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in the event detection method 1700 may be combined and/or the order of some operations may be changed. In addition, different implementations may perform only a portion of the operations associated with the event detection method 1700.

In some implementations, the event detection method 1700 is implemented on an electronic device 510 having one or more processors and memory storing one or more programs for execution by the one or more processors, automatically and without user intervention. Specifically, the electronic device obtains (1702) from a remote server system 508 a classifier model that distinguishes an audio feature from a plurality of alternative features and ambient noises. The classifier model is determined by the remote server system 508 according to capabilities of the electronic device 510 and ambient sound characteristics of the electronic device 510. As explained above with reference to FIG. 7, in some implementations, the electronic device 510 includes a feature extractor 706, a feature classifier 708 and an event detector 710.

The feature extractor 706 obtains (1704) audio data associated with an audio signal, and splits (1706) the audio data to a plurality of sound components each associated with a respective frequency or frequency band and including a series of time windows. In some implementations, splitting the audio data to the plurality of sound components includes (1708) for each executive time window, applying a Fast Fourier Transform (FFT) to obtain a plurality of FFT coefficients associated with the energy levels and the harmonic characteristics for the plurality of sound components each associated with the respective frequency or frequency band.

In some implementations, at least two of the time windows are (1710) consecutive time windows that partially overlap in time. In a specific example, each of the series of time windows lasts (1712) 30 msec.

In some implementations, the plurality of sound components includes (1714) at least three sound components that are associated with a low frequency band, an intermediate frequency band and a high frequency band, respectively. Specifically, in some implementations, each of the plurality of sound components is (1716) associated with one or more of the following frequency bands: 900 Hz and below, 1000-5000 Hz, and 6000 Hz and higher. In some implementations, the plurality of sound components includes (1718) at least one sound component that is associated with a frequency or frequency band related to a baby cry.

Further, the feature extractor 706 statistically analyzes (1720) each of the plurality of sound components across the series of time windows. In some implementations, statistically analyzing the respective sound component includes (1722) for each sound component at each of the series of time windows, statistically analyzing energy levels for a first subset of sound components to obtain a respective energy level. Alternatively, in some implementations, statistically analyzing each of the plurality of sound components across the series of consecutive time windows further includes (1724): for each sound component at each of the series of time windows, identifying a respective harmonic peak, obtaining the intensity and the frequency of the respective harmonic peak, and obtaining the variation of the frequency of the respective harmonic peak with respect to that of another time window preceding to the respective time window.

In accordance with the statistical analysis of the plurality of sound components, the feature extractor 708 extracts (1726) a feature vector from the plurality of sound components. The feature vector includes a plurality of elements that are arranged according a predetermined order. In some implementations, the feature vector further includes (1728) a plurality of Cepstral coefficients obtained by the FFT.

In some implementations, the feature vector includes (1730) a first subset of elements associated with energy levels of a first subset of sound components, and a second subset of elements associated with harmonic characteristics of a second subset of sound components. The first and second subsets of elements in the feature vector are arranged according the predetermined order.

Further, in some implementations, the first subset of elements are (1732) associated with variations of the energy levels for each of the first subset of sound components with respect to the series of time windows. In some implementations, the first subset of elements includes (1734) one or more of a maximum energy level, a minimum energy level, a median energy level, a mean energy level and a difference between the maximum and minimum energy levels that each of the first subset of sound components has across the series of time windows. In some implementations, the first subset of elements includes (1736) one or more of a maximum energy variation, a minimum energy variation, a median energy variation, a mean energy variation and a difference between the maximum and minimum energy variations that each of the first subset of sound components has across the series of time windows.

In addition, in some implementations, the harmonic characteristics of the second subset of sound components are (1738) associated with a respective harmonic peak for each sound component at each of the series of time windows, and include one or more of an intensity value, a harmonic frequency and a variation of the harmonic frequency of the respective harmonic peak. Further, in some implementations, the second subset of elements includes (1740) one or more of a maximum value, a minimum value, a median value, a mean value and a difference between the maximum and minimum values of each harmonic characteristic.

Then, in accordance with the classifier model provided by the remote server, the feature classifier 710 classifies (1742) the extracted feature vector to obtain a probability indicating whether the audio signal includes the audio feature within the series of time windows. In some implementations, the probability that indicates whether the audio signal includes the audio feature has (1744) a magnitude between 0 and 1.

After obtaining the probability value, the event detector 710 detects (1746) the signature event associated with the audio feature based on the probability value associated with the audio signal and issues an alert indicating occurrence of the signature event. In some implementations, the audio signal further includes (1748) an alternative series of consecutive time windows that are distinct from the series of time windows and is associated with at least one additional probability value indicating whether the audio signal includes the audio feature within the alternative series of time windows. The signature event associated with the audio feature is detected based on both the probability value associated with the series of consecutive time windows and the at least one additional probability value. Further, in some implementations, the signature event associated with the audio feature is detected (1750), when both the probability value associated with the series of consecutive time windows and the at least one additional probability value are larger than a predetermined probability threshold. More details on event detection based on the probability value are explained above with reference to FIGS. 12 and 13.

It should be understood that the particular order in which the operations in FIGS. 17A-17D are shown and have been described is merely an example and is not intended to indicate that the described order is the only order in which the operations can be performed. One of ordinary skill in the art would recognize various ways to detect the signature audio event as described herein. Additionally, it should be noted that details of other processes described herein with respect to the event detection method 1700 (e.g., FIGS. 17A-17D) are also applicable in an analogous manner to the event detection process 600 and the system architecture 702 for audio event detection described above with respect to FIGS. 6 and 7, respectively. For brevity, these details are not repeated here.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method for detecting a signature event associated with an audio feature, comprising:
    on an electronic device having one or more processors and memory storing one or more programs for execution by the one or more processors, automatically and without user intervention:

obtaining from a remote server a classifier model that distinguishes an audio feature from a plurality of alternative features and ambient noises, wherein the classifier model is determined by the remote server according to a number of false positives generated by the classifier model, predefined capabilities of the electronic device and ambient sound characteristics of the electronic device, the predefined capabilities of the electronic device comprising one or more of computational capabilities, storage capabilities, and caching capabilities;

obtaining audio data associated with an audio signal;

splitting the audio data to a plurality of sound components each associated with a respective frequency or frequency band and including a series of time windows;

statistically analyzing each of the plurality of sound components across the series of time windows;

extracting a feature vector from the plurality of sound components based on the statistical analysis, the feature vector including a plurality of elements that are arranged according a predetermined order;

classifying the extracted feature vector based on the classifier model to obtain a probability value indicating whether the audio signal includes the audio feature within the series of time windows; and detecting the signature event associated with the audio feature based on the probability value and issuing an alert indicating occurrence of the signature event.

2. The method of claim 1, the feature vector including a first subset of elements associated with energy levels of a first subset of sound components, and a second subset of elements associated with harmonic characteristics of a second subset of sound components, wherein the first and second subsets of elements in the feature vector are arranged according a predetermined order.

3. The method of claim 2, wherein the first subset of elements are associated with variations of the energy levels for each of the first subset of sound components with respect to the series of time windows.

4. The method of claim 2, wherein the first subset of elements includes one or more of a maximum energy level, a minimum energy level, a median energy level, a mean energy level and a difference between the maximum and minimum energy levels that each of the first subset of sound components has across the series of time windows.

5. The method of claim 2, wherein the first subset of elements includes one or more of a maximum energy variation, a minimum energy variation, a median energy variation, a mean energy variation and a difference between the maximum and minimum energy variations that each of the first subset of sound components has across the series of time windows.

6. The method of claim 2, wherein the harmonic characteristics of the second subset of sound components are associated with a respective harmonic peak for each sound component at each of the series of time windows, and include one or more of an intensity value, a harmonic frequency and a variation of the harmonic frequency of the respective harmonic peak.

7. The method of claim 6, wherein the second subset of elements includes one or more of a maximum value, a minimum value, a median value, a mean value and a difference between the maximum and minimum values of each harmonic characteristic.

8. The method of claim 2, wherein statistically analyzing each of the plurality of sound components across the series of time windows includes:

for each sound component at each of the series of time windows, statistically analyzing the energy levels for the first subset of sound components to obtain a respective energy level.

9. The method of claim 1, wherein statistically analyzing each of the plurality of sound components across the series of time windows further includes:

for each sound component at each of the series of time windows:
identifying a respective harmonic peak;
obtaining the intensity and the frequency of the respective harmonic peak; and
obtaining the variation of the frequency of the respective harmonic peak with respect to that of another time window preceding to the respective time window.

10. The method of claim 1, wherein splitting the audio data to the plurality of sound components includes:

for each executive time window:
applying a Fast Fourier Transform (FFT) to obtain a plurality of FFT coefficients associated with the energy levels and the harmonic characteristics for the plurality of sound components each associated with the respective frequency or frequency band.

11. The method of claim 1, wherein the feature vector further includes a plurality of Cepstral coefficients obtained by a FFT.

12. The method of claim 1, wherein at least two of the time windows are consecutive time windows that partially overlap in time.

13. The method of claim 1, wherein each of the series of time windows lasts 30 msec.

14. The method of claim 1, wherein the plurality of sound components includes at least three sound components that are associated respectively with a low frequency band, an intermediate frequency band and a high frequency band.

15. The method of claim 1, wherein each of the plurality of sound components is associated with one or more of the following frequency bands: 0-900 Hz, 1000-5000 Hz and 6000 Hz and higher.

16. The method of claim 1, wherein the plurality of sound components includes at least one sound component that is associated with a frequency or frequency band related to a baby cry.

17. The method of claim 1, wherein the classifier model is selected from a group consisting of: a neural network, a linear support vector machine (SVM), a naïve Bayes classifier, a Gaussian Mixture Model.

18. The method of claim 1, wherein the audio signal further includes an alternative series of time windows that are distinct from the series of time windows and is associated with at least one additional probability value indicating whether the audio signal includes the audio feature within the alternative series of time windows, wherein the signature event associated with the audio feature is detected based on both the probability value associated with the series of time windows and the at least one additional probability value.

19. The method of claim 18, wherein the signature event associated with the audio feature is detected when both the probability value associated with the series of time windows and the at least one additional probability value are larger than a predetermined probability threshold.

20. The method of claim 1, wherein the probability value that indicates whether the audio signal includes the audio feature has a magnitude between 0 and 1.

21. The method of claim 1, wherein the audio feature is associated with a baby sound, and the signature event is associated with an extended baby cry event.

22. A method for detecting a signature event associated with an audio feature, comprising:
on an electronic device having one or more processors and memory storing one or more programs for execution by the one or more processors, automatically and without user intervention:
obtaining audio data associated with an audio signal;
splitting the audio data to a plurality of sound components each associated with a respective frequency or frequency band and including a series of time windows;
statistically analyzing each of the plurality of sound components across the series of time windows;
extracting a feature vector from the plurality of sound components based on the statistical analysis, the feature vector including a first subset of elements associated with energy levels of a first subset of sound components, and a second subset of elements associated with harmonic characteristics of a second subset of sound components, wherein the first and second subsets of elements in the feature vector are arranged according a predetermined order;
classifying the extracted feature vector based on a classifier model provided by a remote server to obtain a probability value indicating whether the audio signal includes the audio feature within the series of time windows, wherein the classifier is configured to recognize the audio feature according to feature vectors that include elements arranged according to the predetermined order, wherein the classifier model is determined by the remote server based on a number of false positives generated by the classifier model and the predefined capabilities of the electronic device comprising one or more of computational capabilities, storage capabilities, and caching capabilities;
detecting the signature event associated with the audio feature based on the probability value and issuing an alert indicating occurrence of the signature event.

23. An electronic device for detecting a signature event associated with an audio feature, the electronic device comprising:
one or more processors; and
memory storing one or more programs to be executed by the one or more processors, the one or more programs comprising instructions for:
obtaining acoustic data associated with an audio signal;
splitting the audio data to a plurality of sound components each associated with a respective frequency or frequency band and including a series of time windows;
statistically analyzing each of the plurality of sound components across the series of consecutive time windows;
extracting a feature vector from the plurality of sound components based on the statistical analysis, the feature vector including a first subset of elements associated with energy levels of a first subset of sound components, and a second subset of elements associated with harmonic characteristics of a second subset of sound components, wherein the first and second subsets of elements in the feature vector are arranged according a predetermined order;
classifying the extracted feature vector based on a classifier model provided by a remote server to obtain a probability value indicating whether the audio signal includes the audio feature within the series of consecutive time windows, wherein the classifier is configured to recognize the audio feature according to feature vectors that include elements arranged according to the predetermined order, wherein the classifier model is determined by the remote server based on a number of false positives generated by the classifier model and the predefined capabilities of the electronic device comprising one or more of computational capabilities, storage capabilities, and caching capabilities;
detecting the signature event associated with the audio feature based on the probability value and issuing an alert indicating occurrence of the signature event.

* * * * *